(12) United States Patent
Volz et al.

(10) Patent No.: US 10,900,585 B2
(45) Date of Patent: Jan. 26, 2021

(54) COAXIAL VALVES

(71) Applicant: Automatic Switch Company, Florham Park, NJ (US)

(72) Inventors: Gregory J. Volz, Pequannock Township, NJ (US); Roy B. Bogert, Lincoln Park, NJ (US); John J. Haller, Boonton, NJ (US); Frank A. Ferrarese, West Caldwell, NJ (US); Ryan Huttman, Milford, PA (US); Emmanuel D. Arceo, Bloomfield, NJ (US)

(73) Assignee: Automatic Switch Company, Florham Park, NJ (US)

( * ) Notice: Subject to any disclaimer, the term of this patent is extended or adjusted under 35 U.S.C. 154(b) by 0 days.

(21) Appl. No.: 16/278,520

(22) Filed: Feb. 18, 2019

(65) Prior Publication Data
US 2020/0263798 A1 Aug. 20, 2020

(51) Int. Cl.
*F16K 31/02* (2006.01)
*F16K 1/12* (2006.01)

(52) U.S. Cl.
CPC ............. *F16K 31/02* (2013.01); *F16K 1/123* (2013.01)

(58) Field of Classification Search
CPC ... F16K 1/12; F16K 3/26; F16K 31/02; F16K 1/123
USPC ............................. 137/613, 614.18, 614.21
See application file for complete search history.

(56) References Cited

U.S. PATENT DOCUMENTS

| | | | |
|---|---|---|---|
| 1,572,469 A | 2/1926 | De Lin | |
| 2,649,110 A | 8/1953 | Bergquist | |
| 3,156,255 A | 11/1964 | Gasquet et al. | |
| 3,191,621 A | 6/1965 | McKinnon et al. | |
| 3,516,435 A | 6/1970 | Schumacher | |
| 3,916,946 A * | 11/1975 | Motzer ................. | F16K 17/044 137/512.2 |
| 4,060,857 A | 12/1977 | Couton | |
| 4,475,710 A | 10/1984 | Leupers | |
| 5,263,508 A | 11/1993 | Perrott | |

(Continued)

FOREIGN PATENT DOCUMENTS

| | | |
|---|---|---|
| DE | 4010163 C1 | 5/1991 |
| FR | 2422089 A1 | 11/1979 |

(Continued)

OTHER PUBLICATIONS

Bailey Valves, Inc. "B-10" baileyvalve.com (2012); accessed: Apr. 2018.

(Continued)

*Primary Examiner* — Kevin L Lee
(74) *Attorney, Agent, or Firm* — Mackey Law Firm PLLC

(57) ABSTRACT

A valve can include a body having an inlet and an outlet coaxial about an axis, a stationary valve seat between the inlet and the outlet, one or more valve members slideably coupled to the valve body and adapted to optionally couple with the valve seat, one or more biasing devices adapted to bias the valve member(s) in one or more longitudinal directions, and one or more actuators adapted to optionally move the valve member(s) into and/or out of sealing engagement with the valve seat. An actuator assembly can include one or more of an electrohydraulic actuator and an electromechanical actuator, among others.

18 Claims, 20 Drawing Sheets

(56) References Cited

U.S. PATENT DOCUMENTS

| | | | |
|---|---|---|---|
| 5,826,613 A * | 10/1998 | Schalk | F16K 1/123 |
| | | | 137/219 |
| 5,941,505 A | 8/1999 | Nagel | |
| 6,296,152 B1 | 10/2001 | Semenenko | |
| 6,446,657 B1 * | 9/2002 | Dziomy et al. | F01D 17/105 |
| | | | 137/219 |
| 6,742,539 B2 | 6/2004 | Lyons | |
| 6,957,655 B2 * | 10/2005 | Erickson et al. | A61M 5/14216 |
| | | | 137/1 |
| 8,286,937 B2 * | 10/2012 | Forster | F16K 1/12 |
| | | | 137/219 |
| 8,746,658 B2 * | 6/2014 | Gauss et al. | F16K 31/047 |
| | | | 251/129.12 |
| 8,967,178 B2 | 3/2015 | Steele et al. | |
| 9,726,440 B2 | 8/2017 | Bhatia et al. | |
| 10,119,735 B2 | 11/2018 | Zhang et al. | |

FOREIGN PATENT DOCUMENTS

| | | |
|---|---|---|
| GB | 685371 | 11/1952 |
| WO | 2015062422 A1 | 5/2015 |

OTHER PUBLICATIONS

Pratt "Sleeve Valve Energy Dissipaters" henrypratt.com Form 13288 (2017); accessed: Apr. 2018.

Omal S.P.A., Pneumatic Valves, Vip—Pneumatic coaxial valve, pp. 1-16, at least by Jul. 16, 2020.

Invitation to Pay Additional Fees and, Where Applicable, Protest Fee dated Jun. 4, 2020 for International Patent Application No. PCT/US2020/018535.

* cited by examiner

COAXIAL VALVES

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to coaxial valves.

Description of the Related Art

Various types of coaxial valves are known in the art, such as coaxial valves having a single tubular sleeve operated manually, pneumatically or by solenoid. Coaxial valves can offer higher flow rates in some instances than other types of valves (e.g., poppet valves) of equivalent flow size or pipe size due to more efficient fluid flow through the valve. Coaxial valves may also be desirable in some instances because they can require less force to open versus some other types of valves due to the coaxial valve having a smaller pressure area for opening the valve. Similarly, a coaxial valve can resist higher levels of back pressure than some other valve types because the forces of the back pressure are acting on a relatively smaller area. While known coaxial valves may suffice for some applications, a need exists in the art for improved coaxial valves having different types of actuators and/or redundant sealing features.

The disclosures and teachings herein are directed to systems and methods for improved coaxial valves.

BRIEF SUMMARY OF THE INVENTION

In at least one embodiment, a valve can include a valve body having a valve flow passage there through, a fluid inlet and a fluid outlet fluidically downstream from the fluid inlet, which can include an inlet and an outlet coaxial about a central longitudinal axis and/or other locations along a valve flow path coaxial about an axis, a valve seat disposed in the valve flow passage fluidically between the inlet and the outlet, a valve member slideably and sealingly coupled to the valve body and configured to optionally couple with the valve seat, such as to restrict or prevent fluid flow through the valve, a biasing device configured to bias the valve member in one or more longitudinal or other directions, which can include into or out of, or toward or away from, sealing engagement with the valve seat, and an actuator assembly configured to optionally move the valve member in one or more longitudinal directions, which can include a direction opposite or otherwise different from a first or other longitudinal direction and into or out of, or toward or away from, sealing engagement with the valve seat. An actuator assembly can include at least one of an electrohydraulic actuator, an electromechanical actuator, a pump, an electric motor, a stepper motor, a gear box, an electromagnet, a solenoid, a pilot valve and a combination thereof.

In at least one embodiment, a valve can include one or more additional valve members, such as a second valve member, slideably and sealingly coupled to the valve body, and a second biasing device configured to bias the second valve member into or out of sealing engagement with the valve seat. An actuator assembly can be configured to optionally move a second valve member into or out of sealing engagement with a valve seat, which can include the same or a different valve seat. In at least one embodiment, a first valve member can be configured to couple with an upstream side of a valve seat and a second valve member can be configured to couple with a downstream side of a valve seat. An actuator assembly can be configured to optionally move the second valve member in one or more directions.

In at least one embodiment, first and second valve members can be configured to couple with the same side of a valve seat and an actuator assembly can be configured to optionally move the valve members in one or more directions. In at least one embodiment, a second valve member can be at least partially tubular and at least a portion of a first valve member can be disposed within the second valve member. A second valve member can be at least partially tubular and at least a portion of a first valve member and at least a portion of the second valve member can be concentric. In at least one embodiment, upstream and downstream sides of a valve seat can be disposed within one or more orifices, which can include a single orifice. In at least one embodiment, upstream and downstream sides of a valve seat can be opposite sides of a unitary valve seat member or a plurality of valve seat members.

A valve member can include a piston coupled to a tubular sleeve and slideably disposed within a chamber of the valve body, and an actuator assembly can be configured to move the valve member in one or more directions, such as a longitudinal direction, via or by way of pressurized fluid. In at least one embodiment, an actuator assembly can include one or more pumps configured to pump one or more working fluids into one or more chambers. In at least one embodiment, a valve can include one or more pilot flow passages in fluid communication with a valve flow passage and one or more chambers and an actuator assembly can include a pilot valve member configured to couple with a valve seat disposed in a pilot flow passage. A valve member can include a piston coupled to a tubular sleeve and slideably disposed within a chamber of the valve body. In at least one embodiment, a valve can include one or more bleed orifices in fluid communication with one or more chambers and a valve flow passage.

In at least one embodiment, a valve can include a valve body having a valve flow passage there through, a fluid inlet and a fluid outlet fluidically downstream from the fluid inlet, wherein the inlet and the outlet can be coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a first biasing device configured to bias the first valve member into sealing engagement with the valve seat, a second valve member slideably and sealingly coupled to the valve body and configured to optionally couple with the valve seat to prevent fluid flow through the valve, a second biasing device configured to bias the second valve member into sealing engagement with the valve seat, and an actuator assembly coupled to the valve body and configured to optionally move the first and second valve members out of sealing engagement with the valve seat.

In at least one embodiment, a valve can include a first actuator configured to move the first valve member out of sealing engagement with the valve seat and a second actuator configured to move the second valve member out of sealing engagement with the valve seat. A first valve member can be configured to couple with the upstream side of the valve seat and a second valve member can be configured to couple with the downstream side of the valve seat. In at least one embodiment, first and second valve members can be configured to couple with the same or different sides of one or more valve seats.

One or more valve members can include an at least partially tubular sleeve, which can make up at least a portion of one or more valve flow passages. A biasing device can be configured to bias a valve member in a first longitudinal direction, and another biasing device can be configured to bias another valve member in one or more directions, which can be the same as or different from the first longitudinal direction. In at least one embodiment, a first biasing device can be configured to bias a first valve member in a first longitudinal direction, and a second biasing device can be configured to bias a second valve member in a second longitudinal direction that can be opposite the first longitudinal direction.

DETAILED DESCRIPTION

Figure 1:
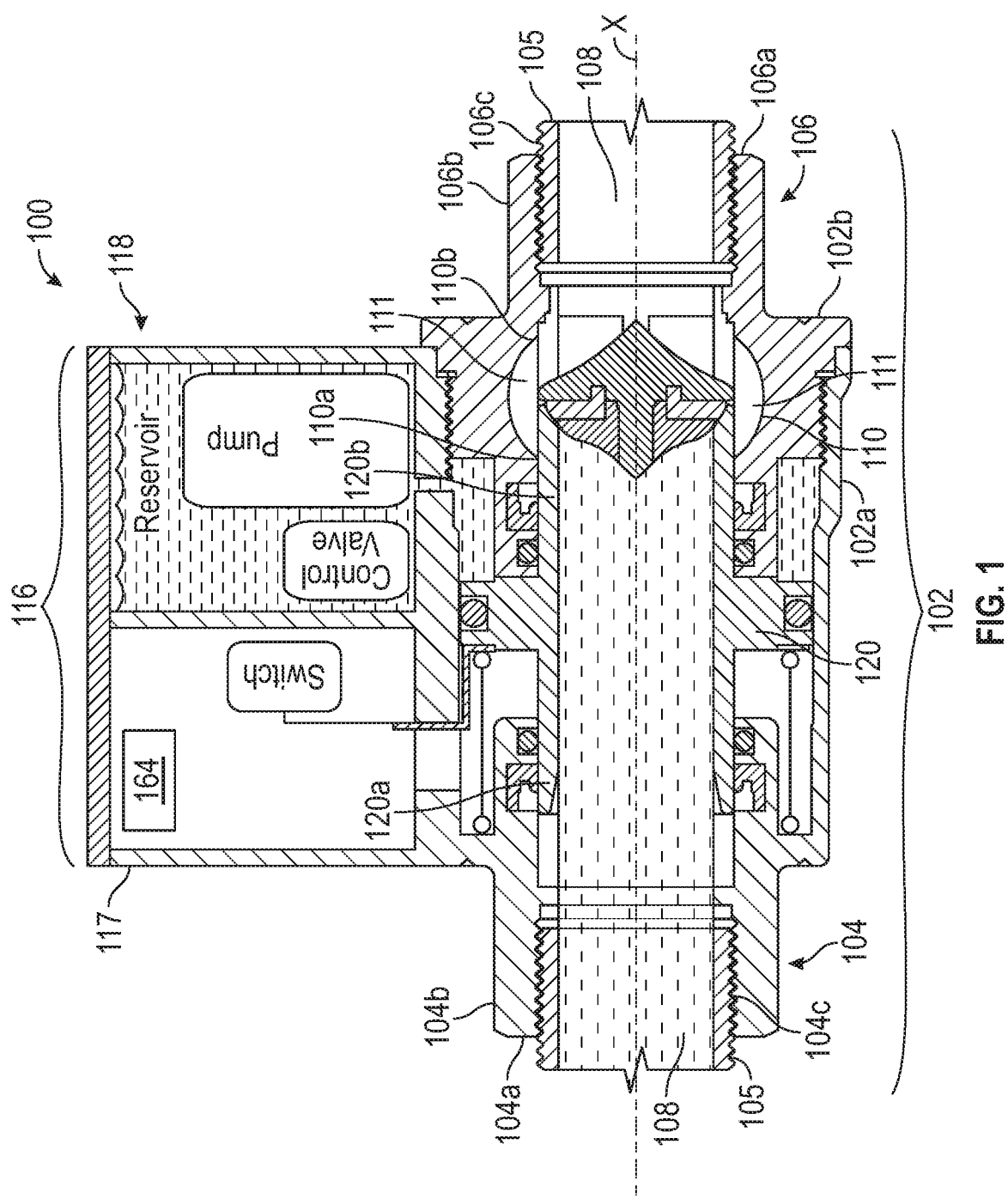
FIG. 1 is a side cross-sectional view of one of many embodiments of a valve according to the disclosure in a closed position.

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts nevertheless would be a routine undertaking for those of skill in the art having the benefits of this disclosure. The embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created systems and methods for improved coaxial valves having advantageous actuators and/or having advantageous redundancy features for at least partially reducing the chance of failure during operation. Embodiments of the present disclosure can include, among other things, an actuator assembly including one or more actuators, which can include at least one of an electrohydraulic actuator, an electromechanical actuator, a pump, an electric motor, a stepper motor, a gear box, an electromagnet, a solenoid, a pilot valve and a combination thereof. Whether separately or in combination with any of the foregoing, embodiments of the present disclosure can include a plurality of sealing components for redundantly resisting fluid flow through a valve when the valve is in one or more positions.

Figure 2:
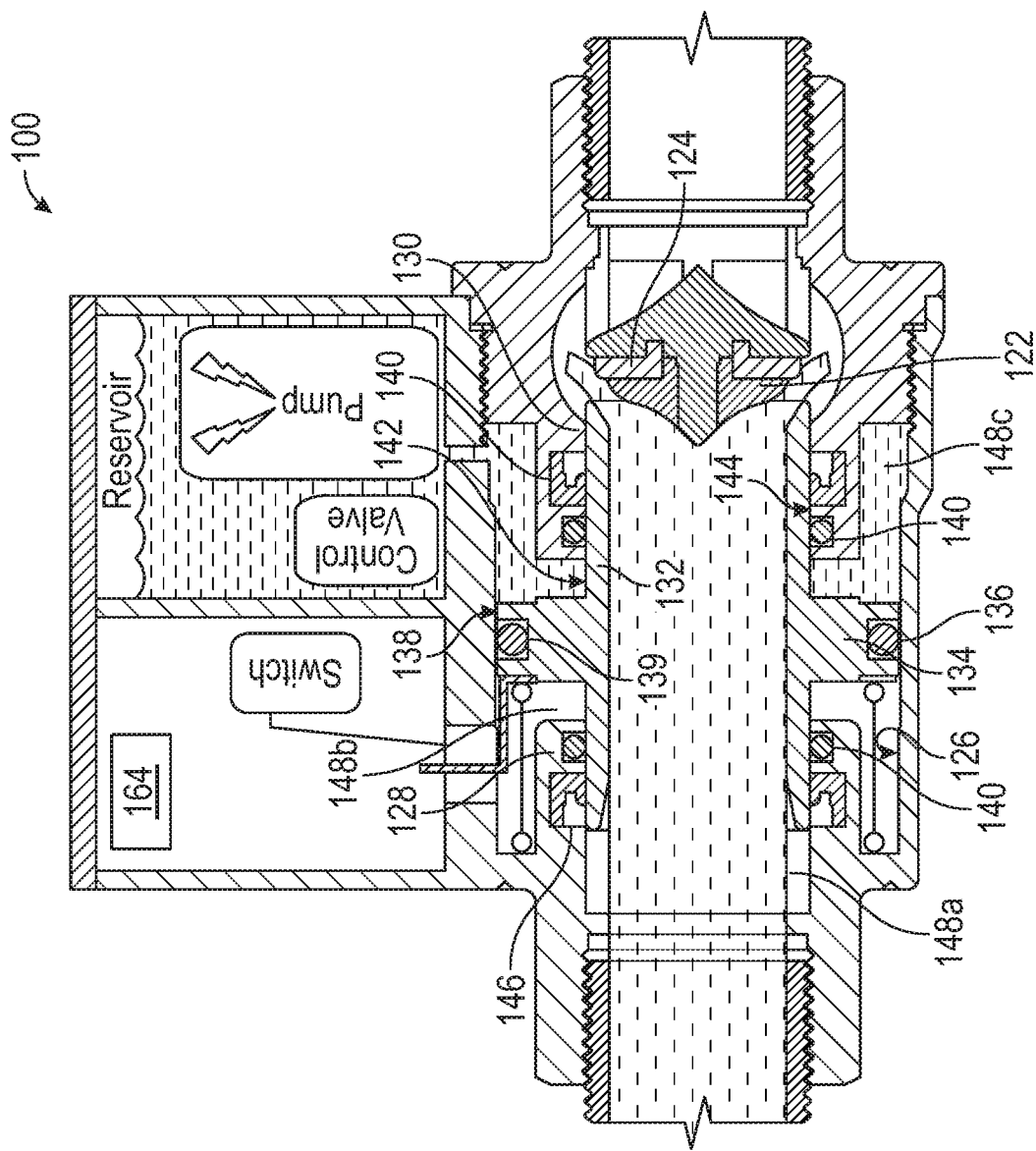
FIG. 2 is a side cross-sectional view of the valve of FIG. 1 in a transitional position.
Figure 3:
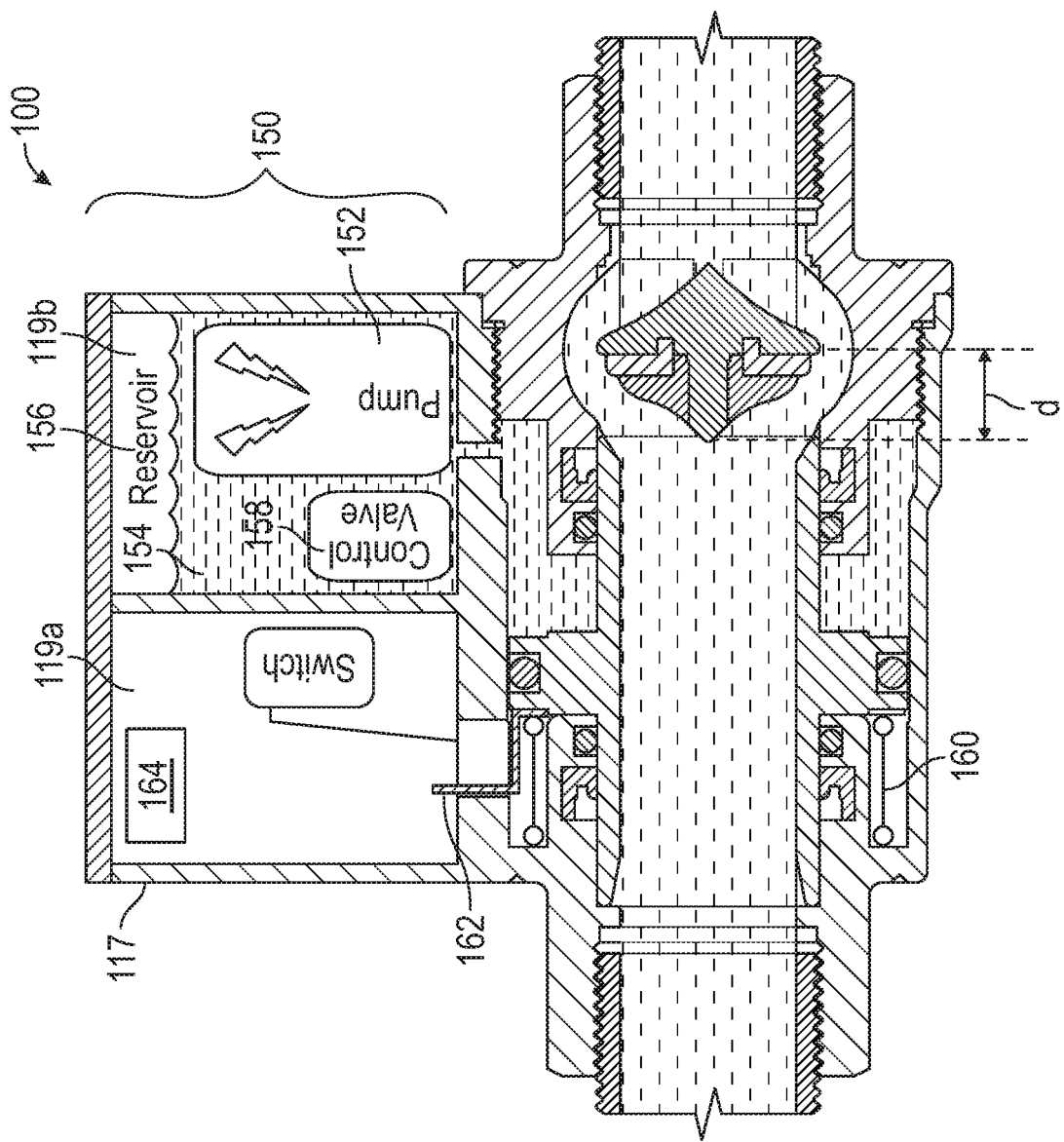
FIG. 3 is a side cross-sectional view of the valve of FIG. 1 in an open position.
Figure 4:
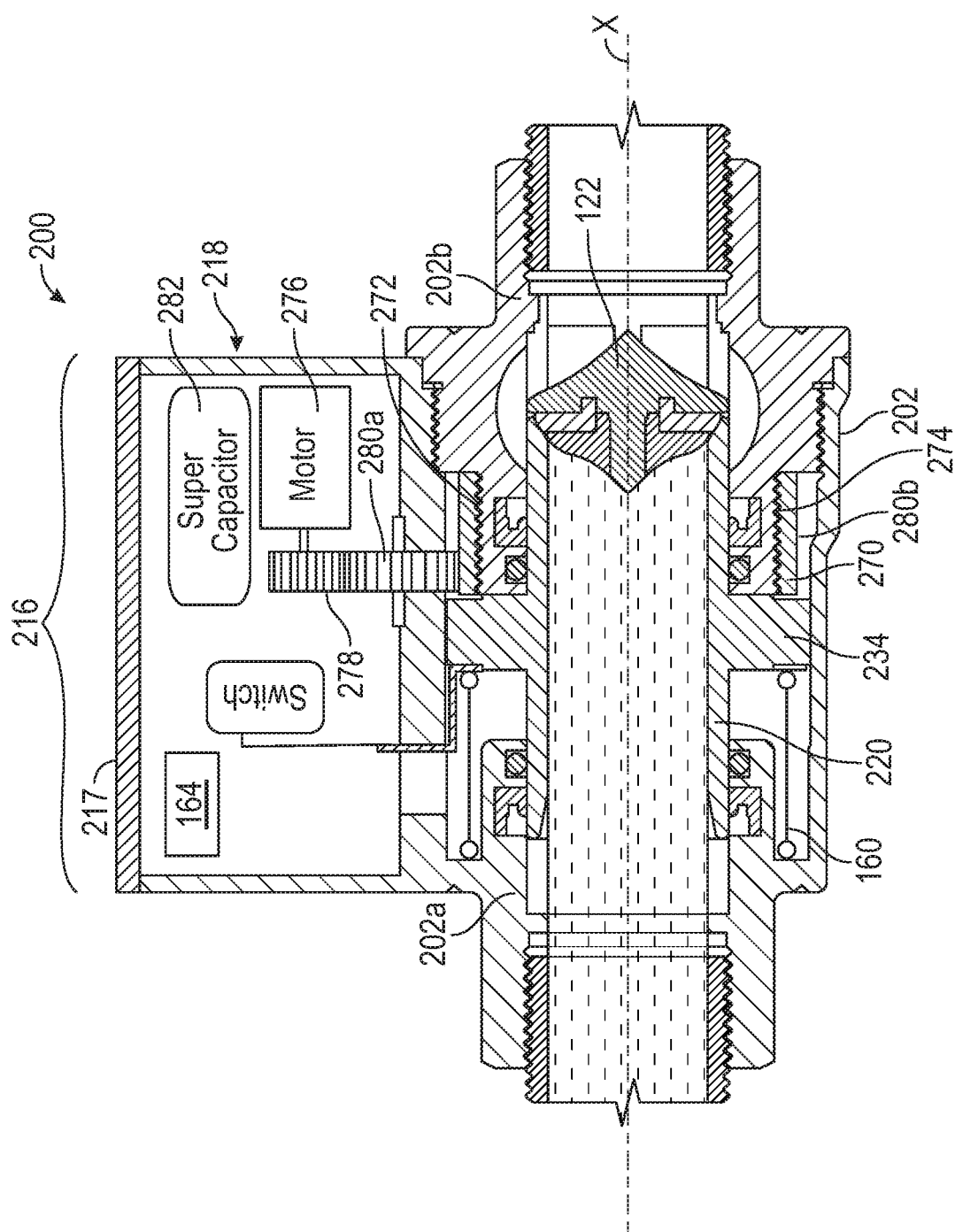
FIG. 4 is a side cross-sectional view of another of many embodiments of a valve according to the disclosure in a closed position.
Figure 5:
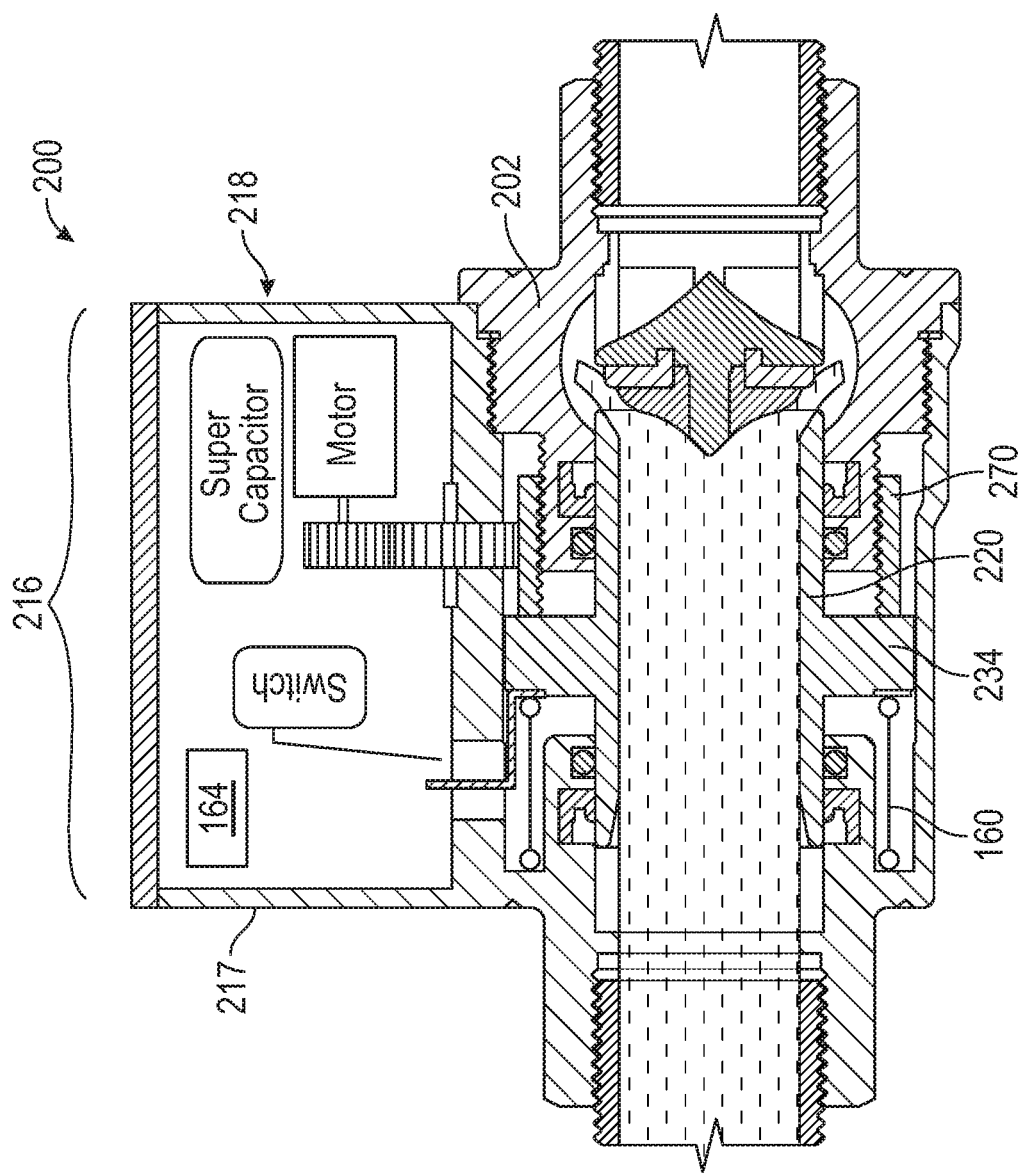
FIG. 5 is a side cross-sectional view of the valve of FIG. 4 in a transitional position.
Figure 6:
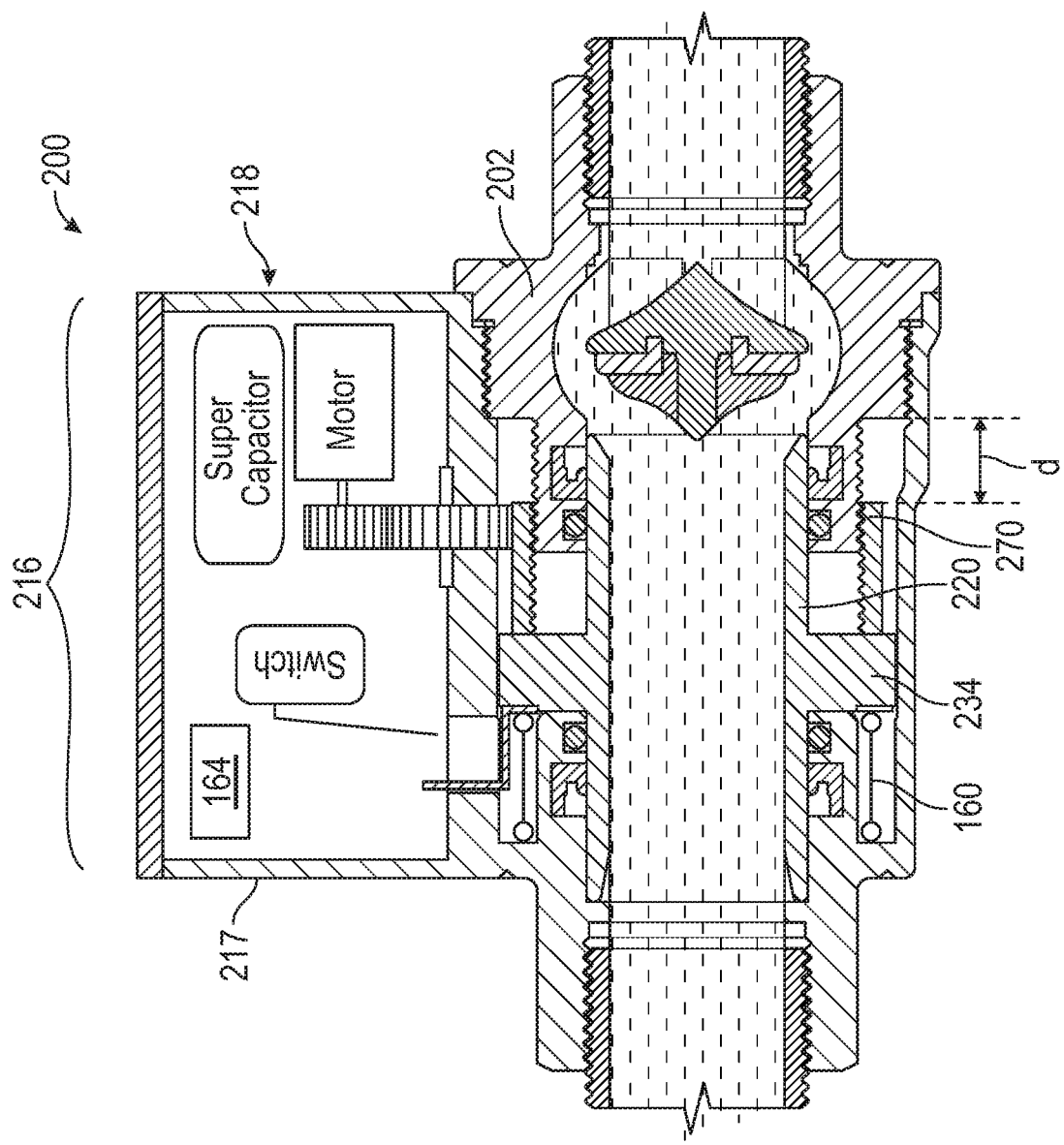
FIG. 6 is a side cross-sectional view of the valve of FIG. 4 in an open position.
Figure 7:
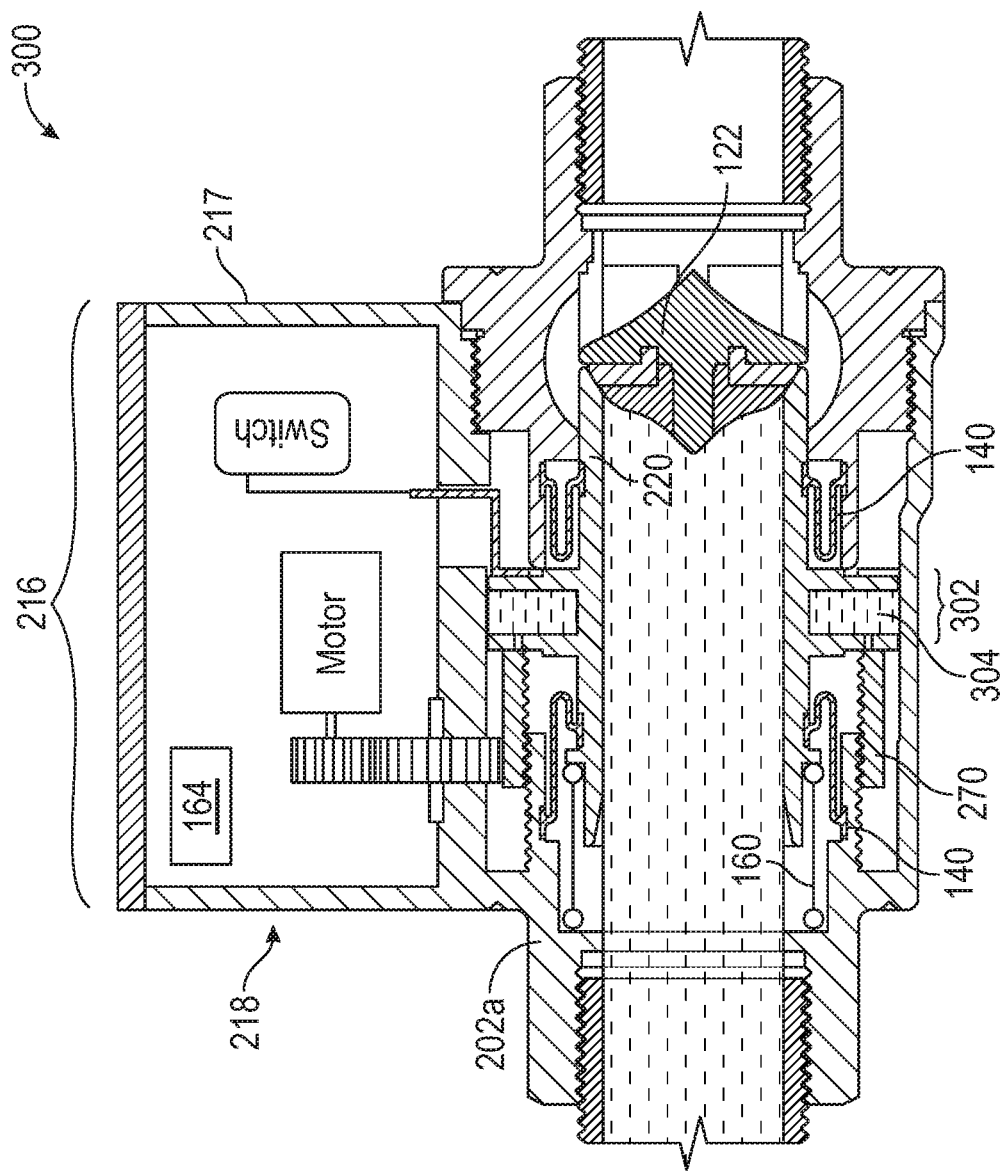
FIG. 7 is a side cross-sectional view of yet another of many embodiments of a valve according to the disclosure in a closed position.
Figure 8:
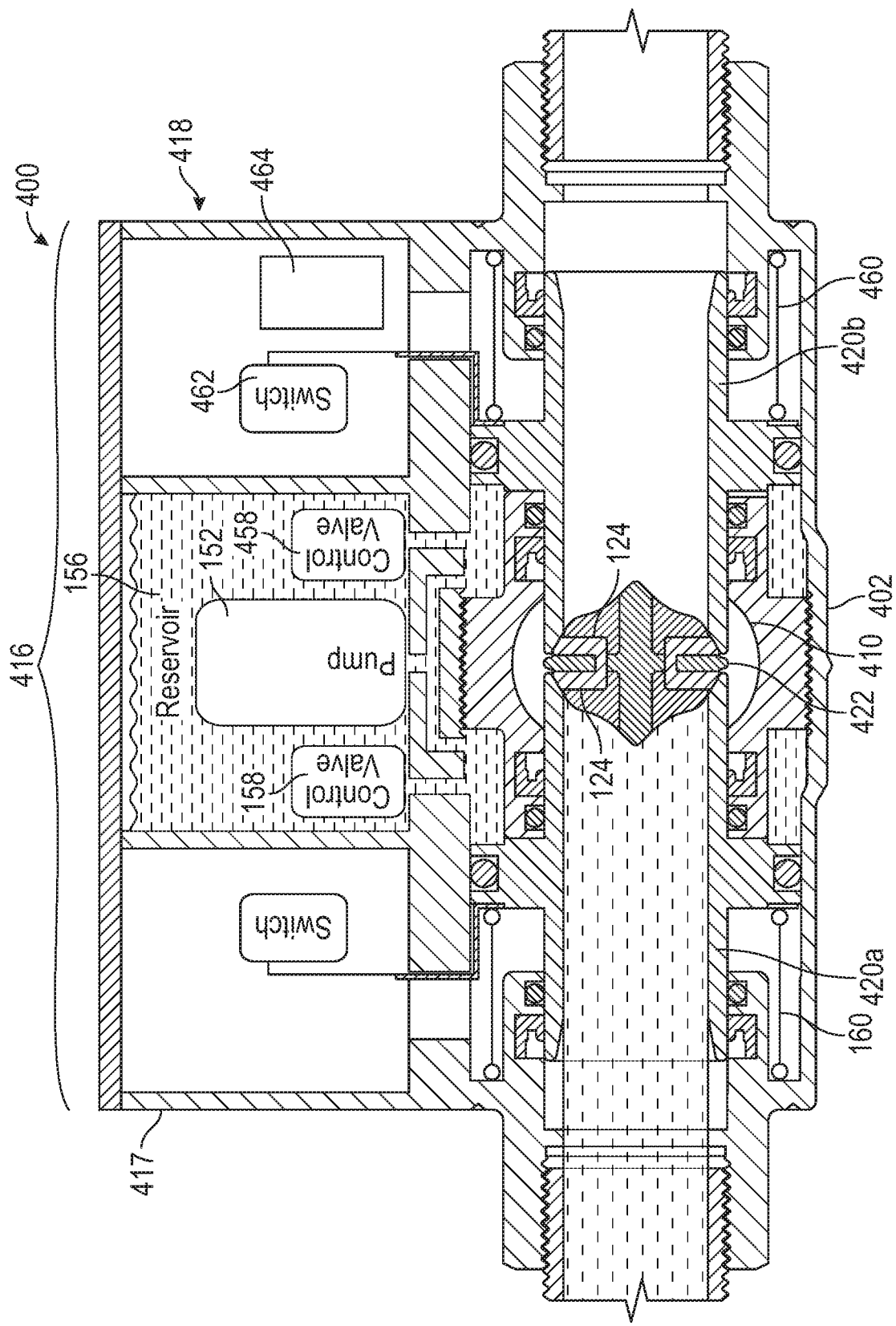
FIG. 8 is a side cross-sectional view of still another of many embodiments of a valve according to the disclosure in a closed position.
Figure 9:
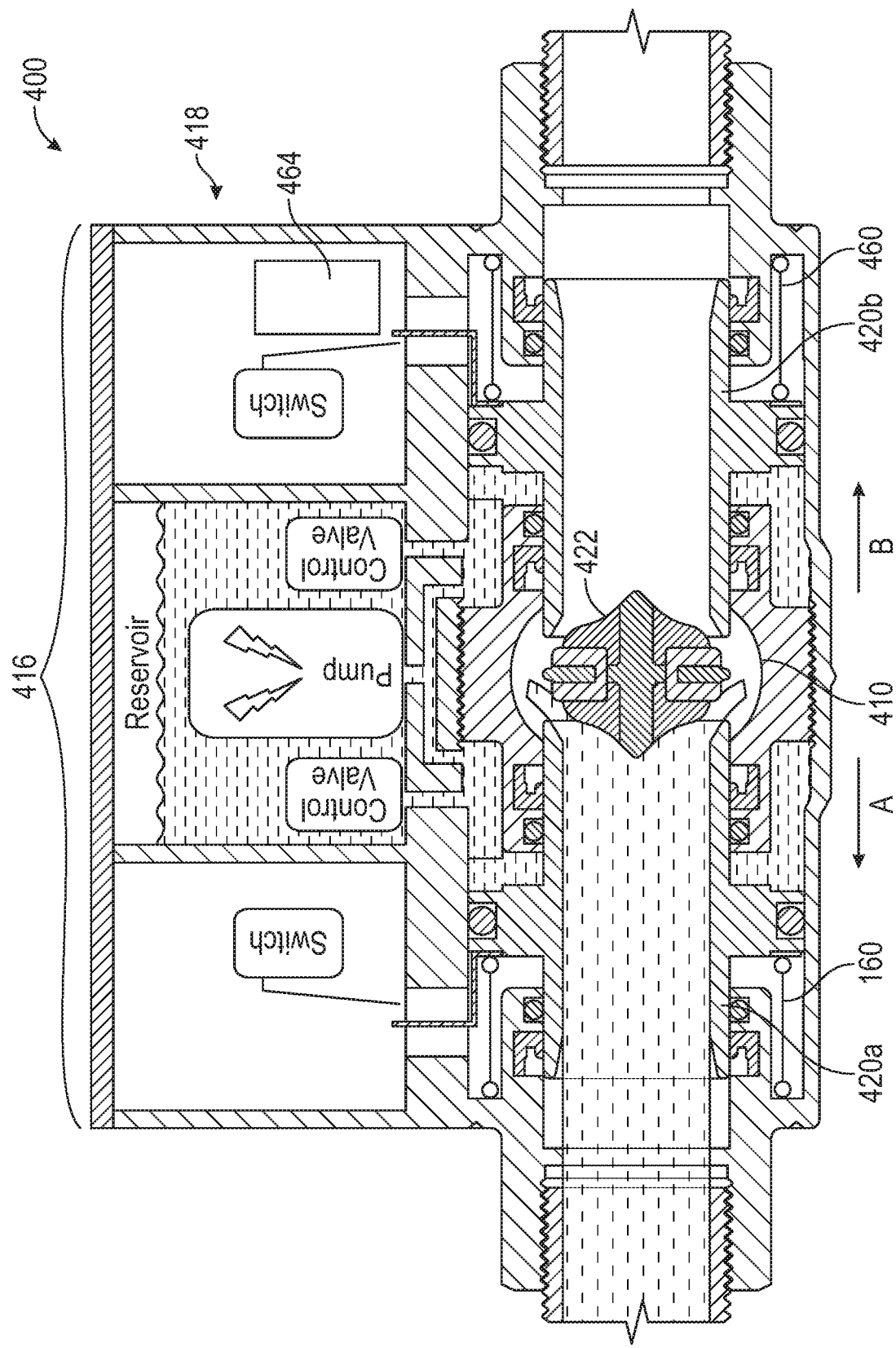
FIG. 9 is a side cross-sectional view of the valve of FIG. 8 in a transitional position.
Figure 10:
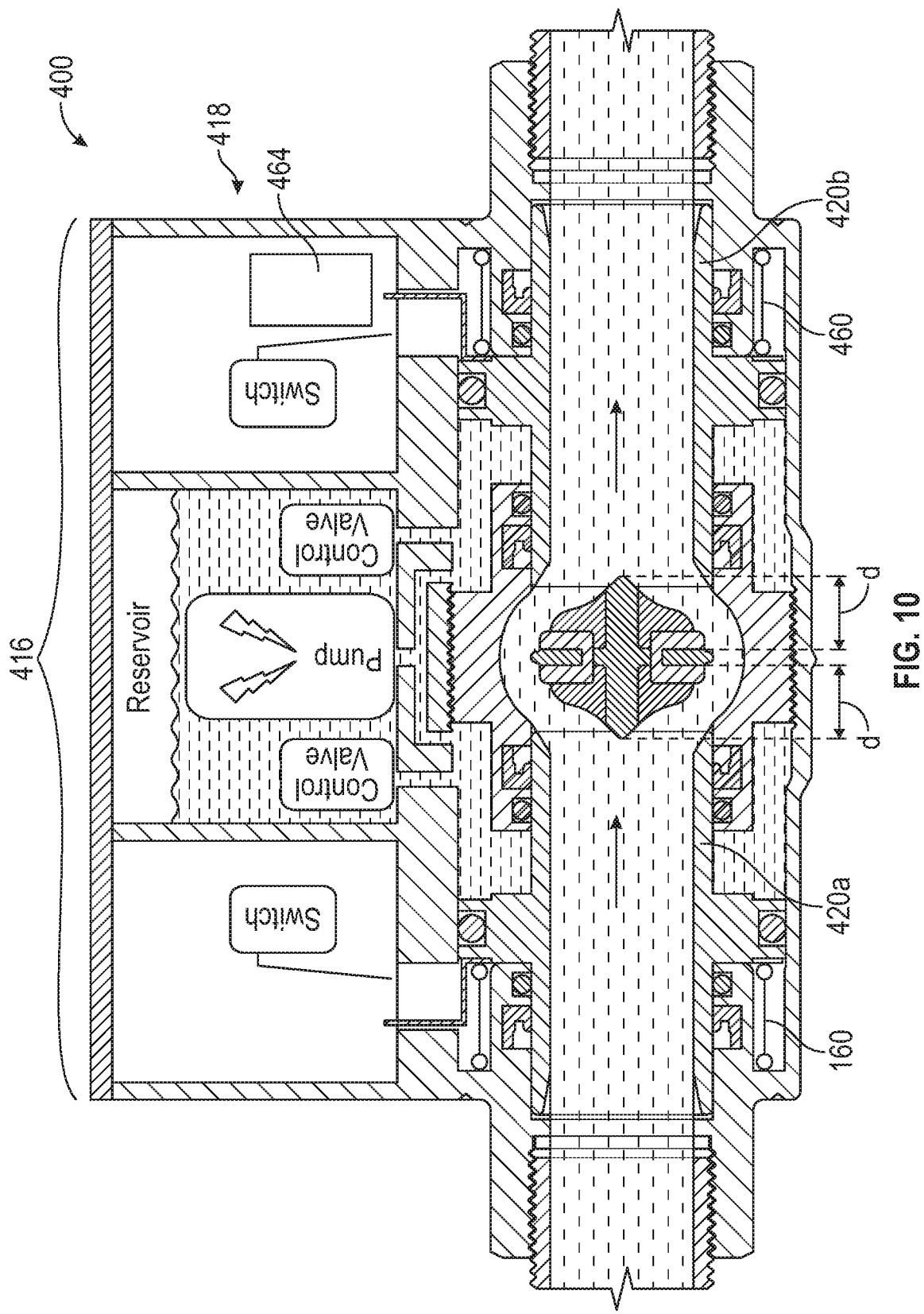
FIG. 10 is a side cross-sectional view of the valve of FIG. 8 in an open position.
Figure 11A:
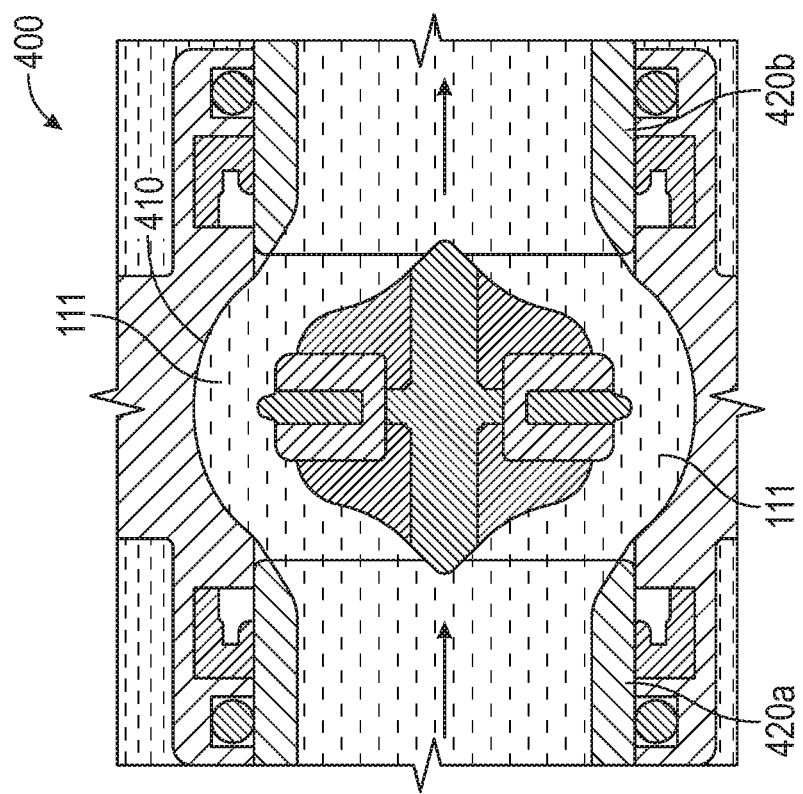
FIG. 11A is a detail view of one of many embodiments of a valve having a single valve member according to the disclosure.
Figure 11B:
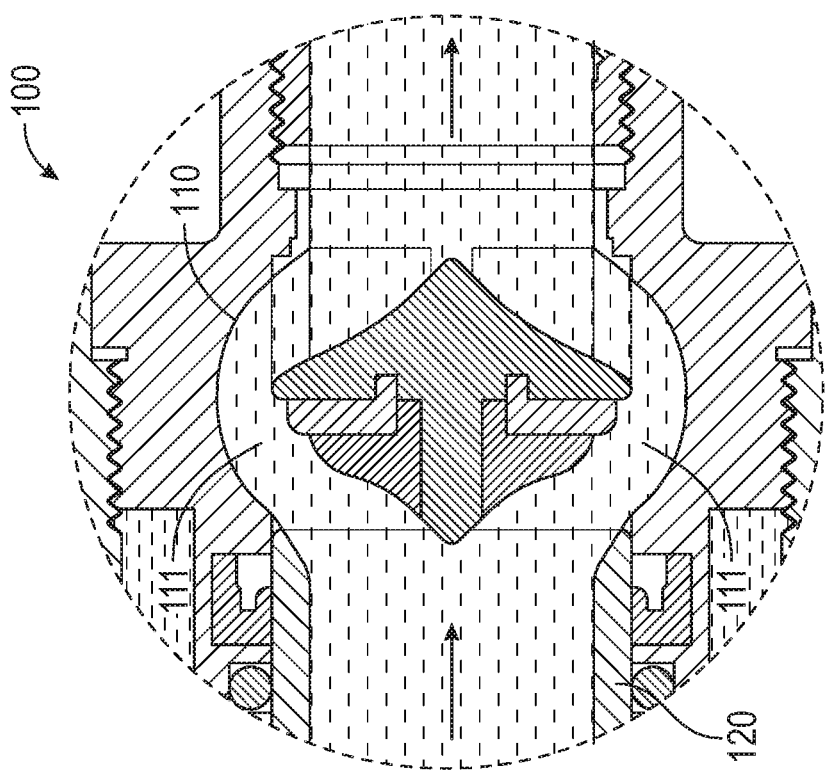
FIG. 11B is a detail view of one of many embodiments of a valve having a plurality of valve members according to the disclosure.
Figure 12:
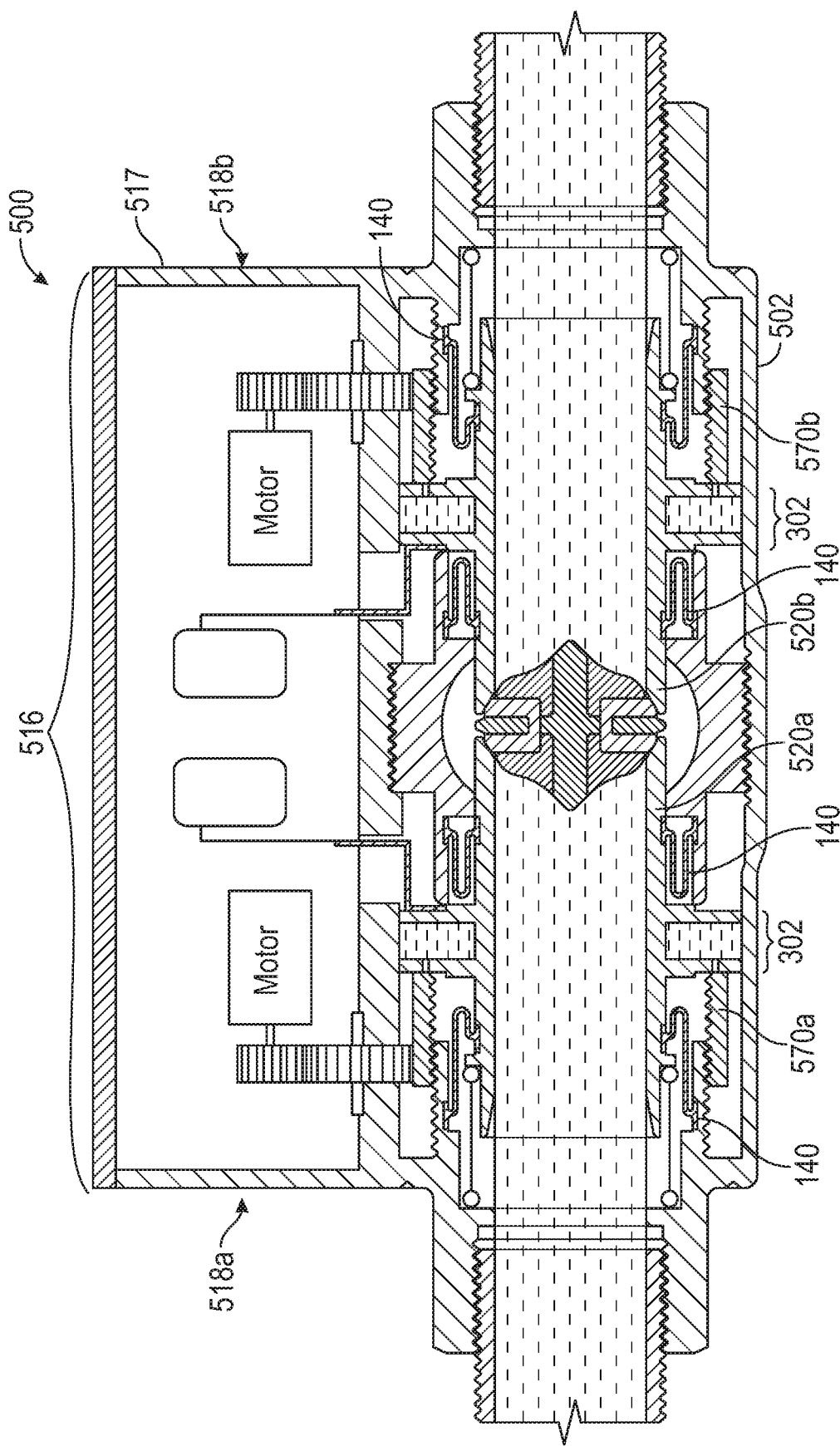
FIG. 12 is a side cross-sectional view of one of many embodiments of a double coaxial valve according to the disclosure.
Figure 13:
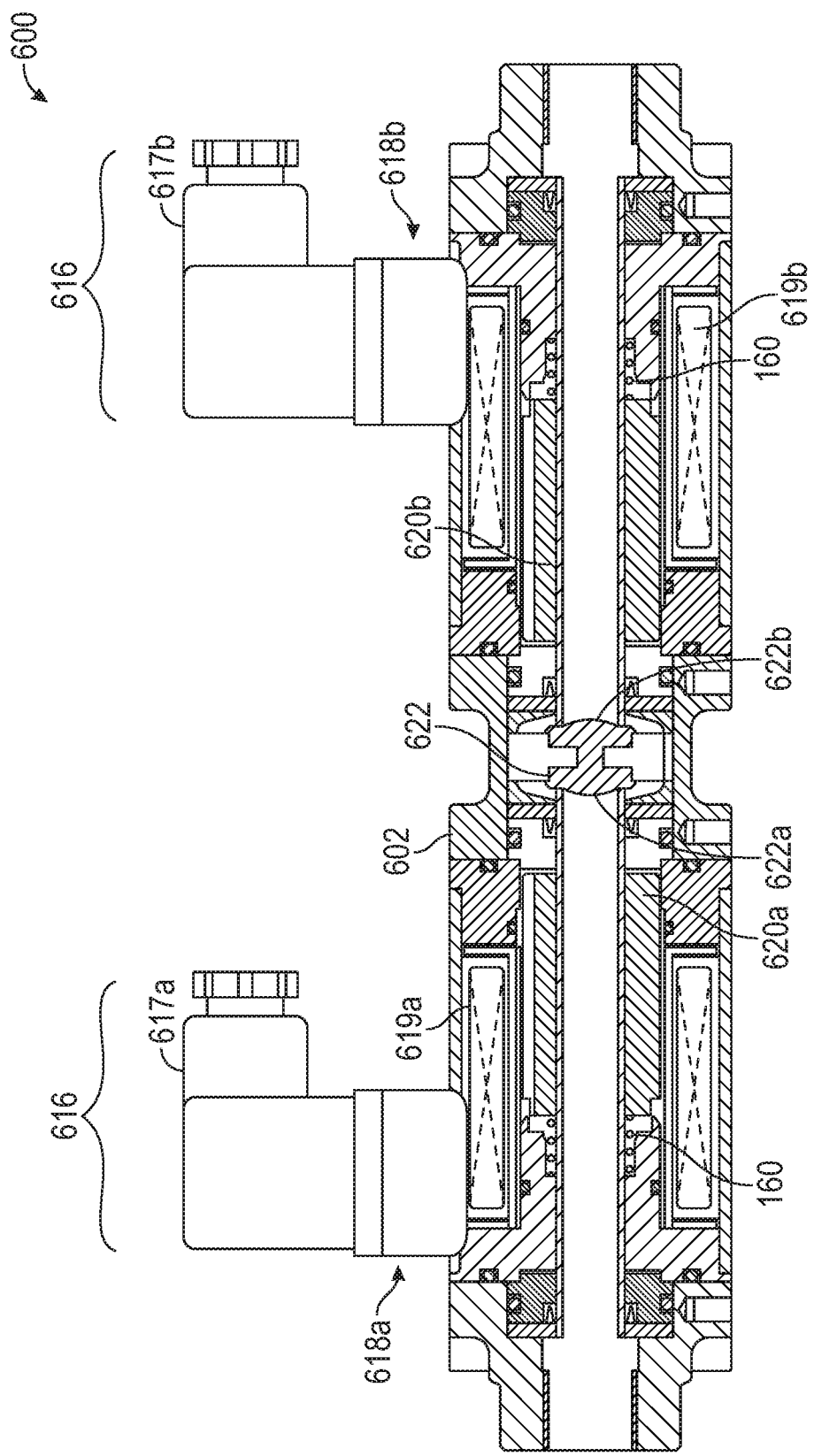
FIG. 13 is a side cross-sectional view of another of many embodiments of a double coaxial valve according to the disclosure.
Figure 14:
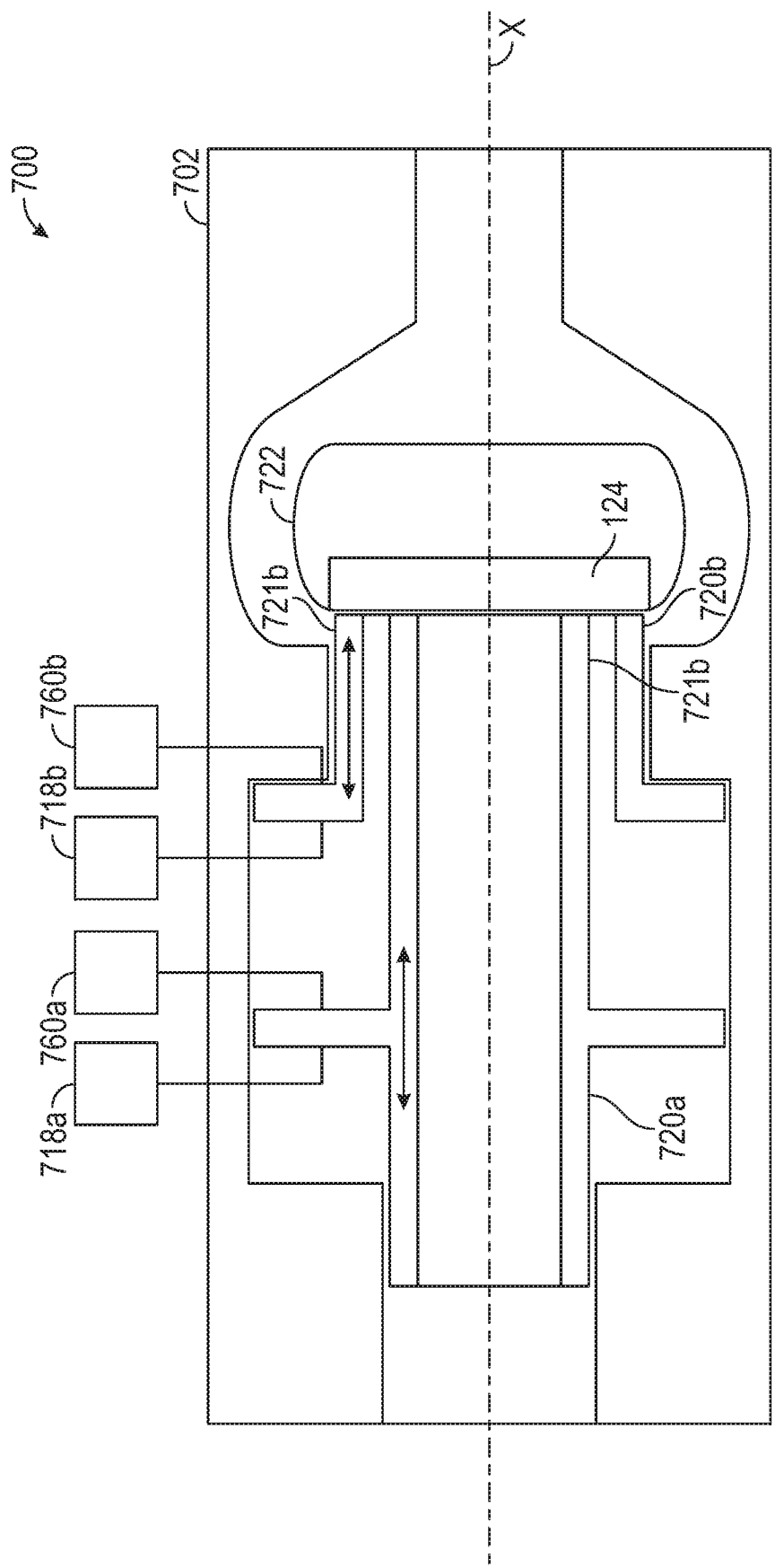
FIG. 14 is a schematic view of yet another of many embodiments of a double coaxial valve according to the disclosure.
Figure 15:
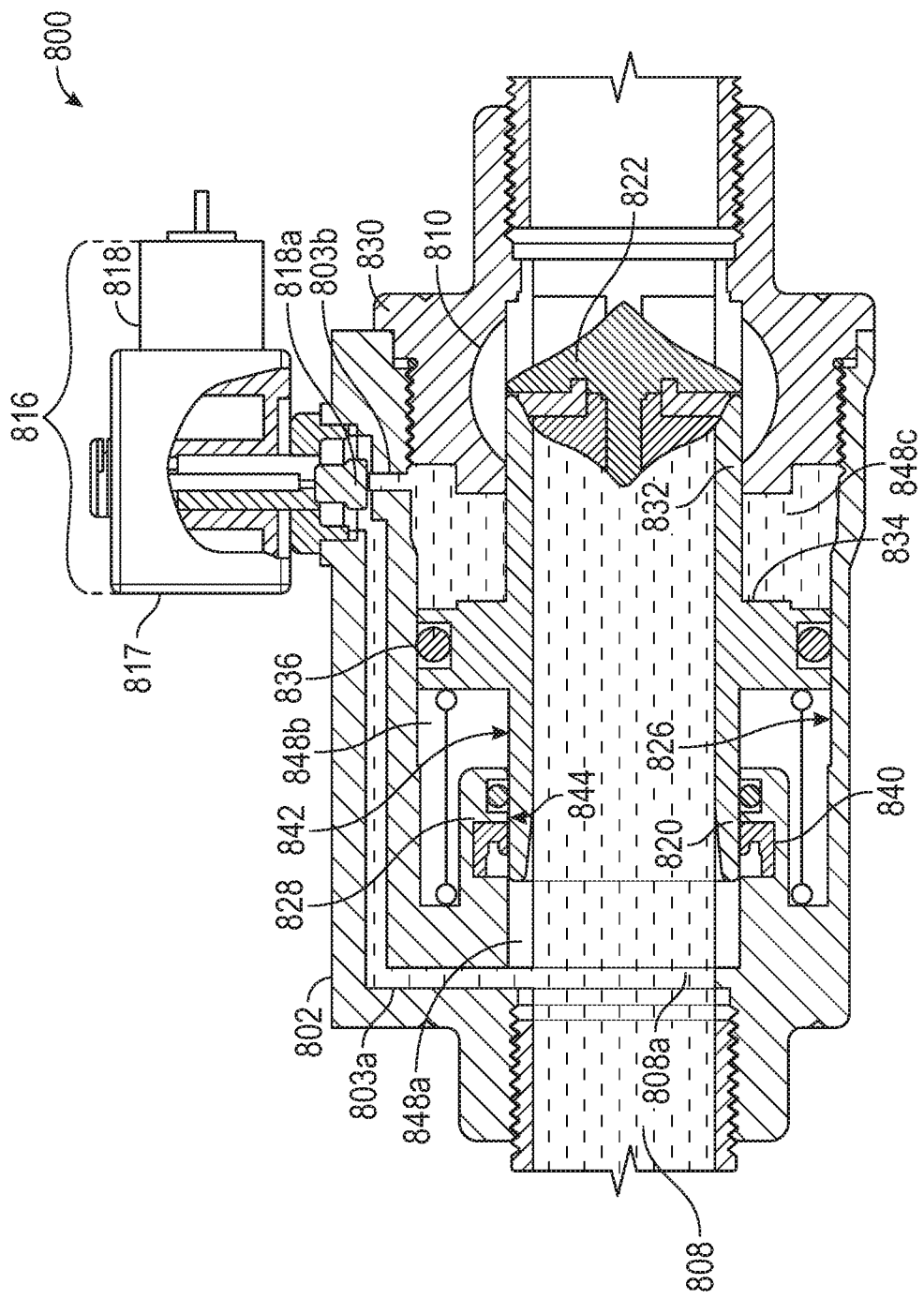
FIG. 15 is a side cross-sectional view of one of many embodiments of an internally piloted coaxial valve according to the disclosure in a closed position.
Figure 16:
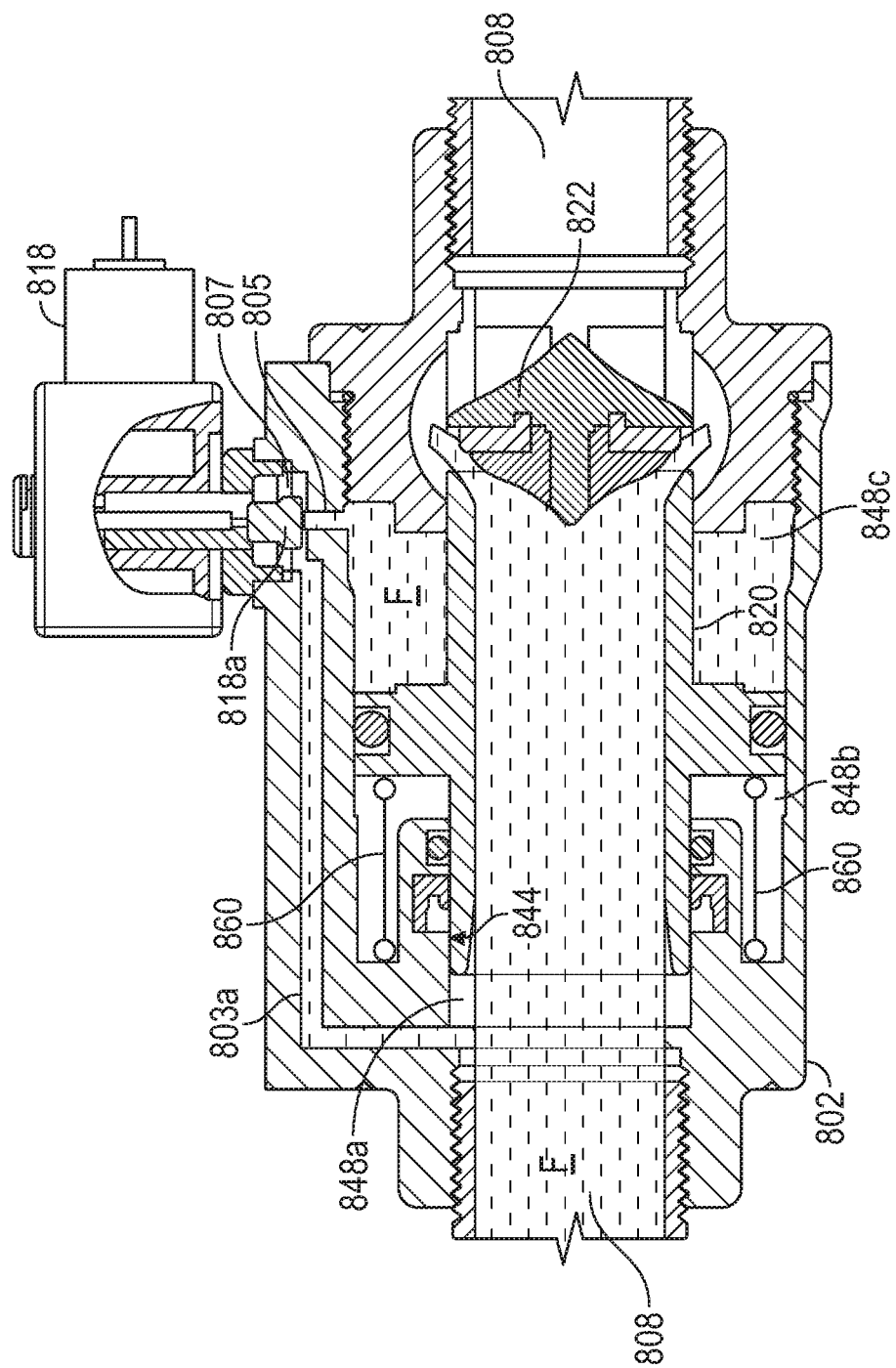
FIG. 16 is a side cross-sectional view of the valve of FIG. 15 in a transitional position.
Figure 17:
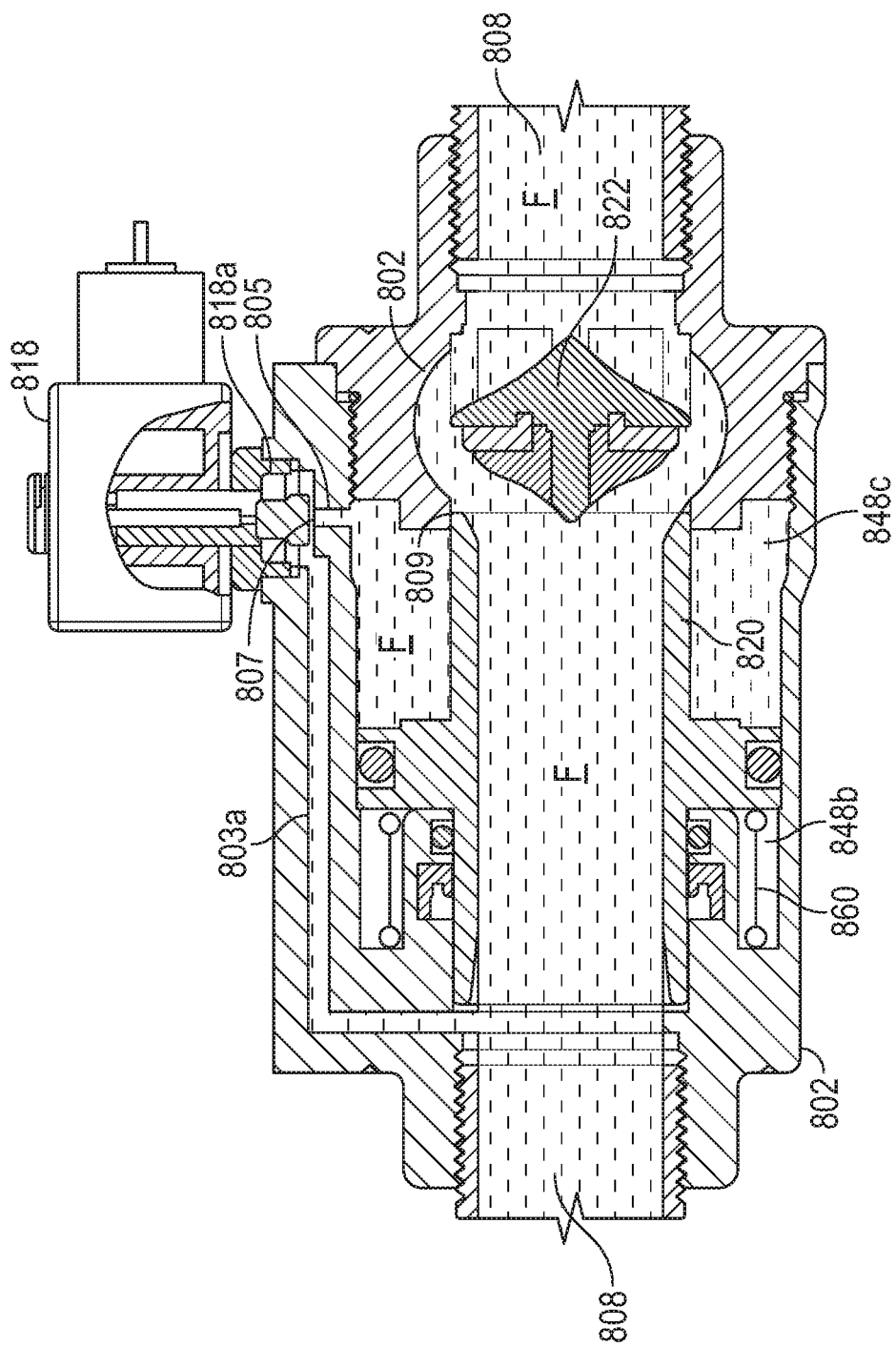
FIG. 17 is a side cross-sectional view of the valve of FIG. 15 in an open position.
Figure 18:
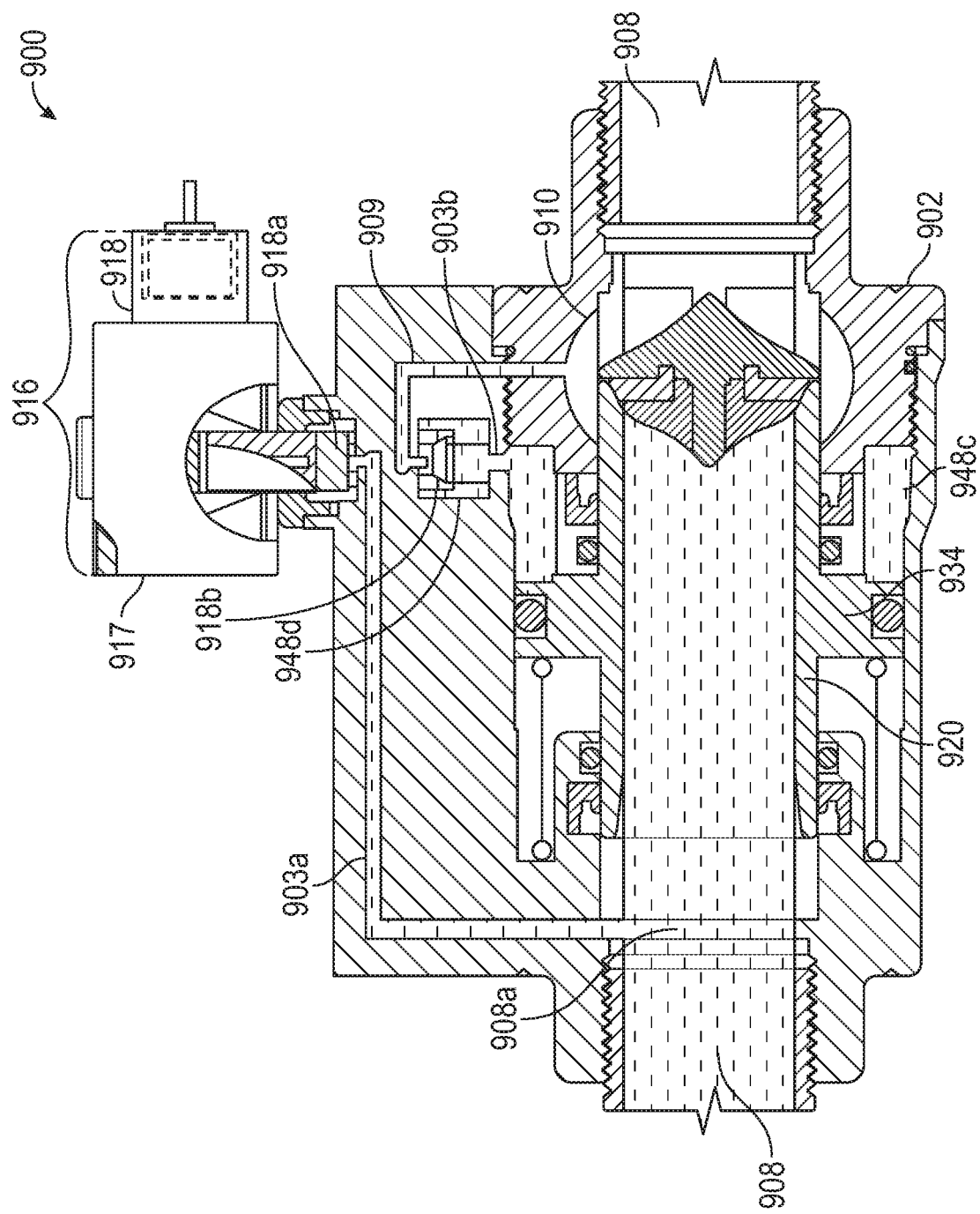
FIG. 18 is a side cross-sectional view of another of many embodiments of an internally piloted coaxial valve according to the disclosure in a closed position.
Figure 19:
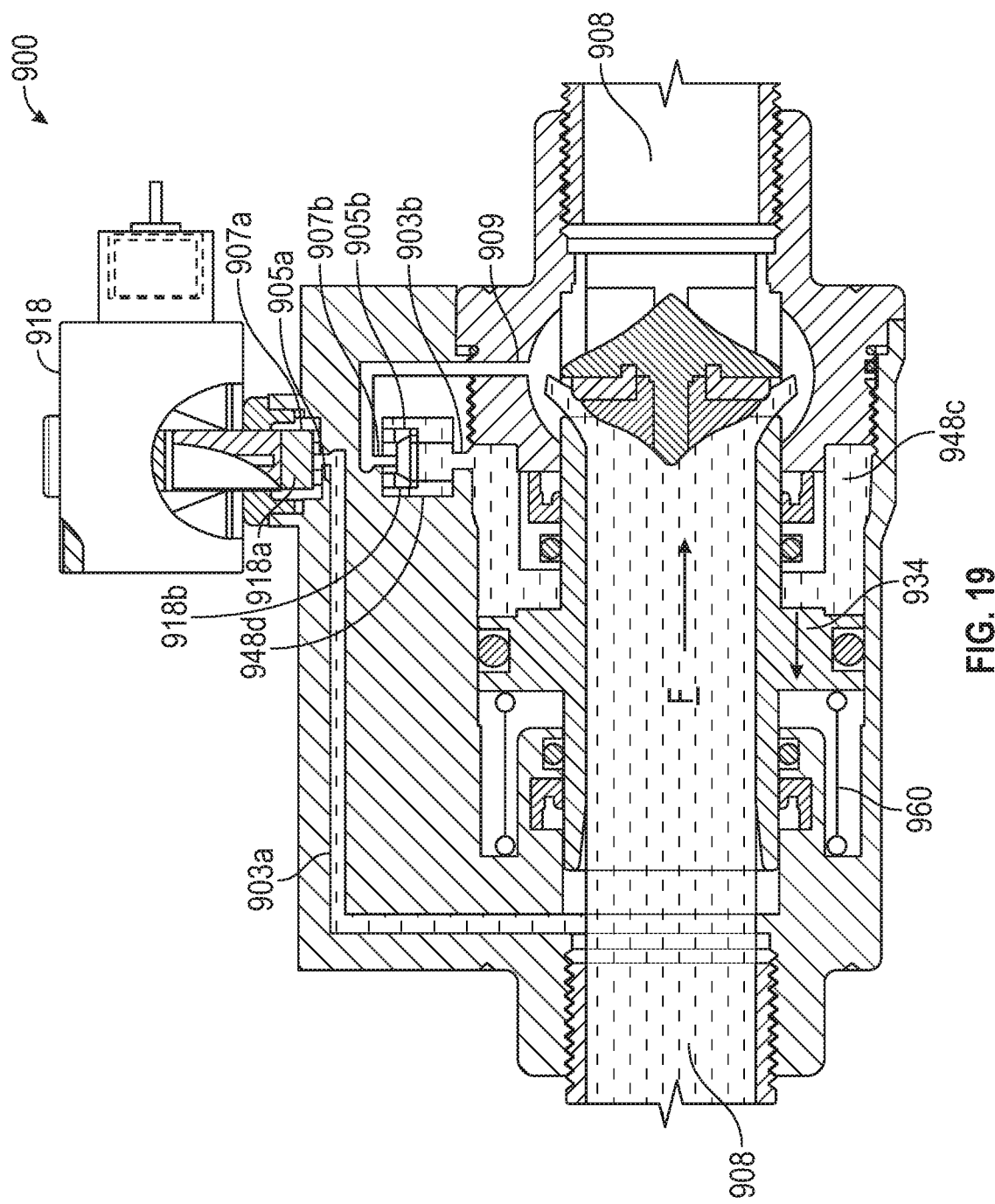
FIG. 19 is a side cross-sectional view of the valve of FIG. 18 in a transitional position.
Figure 20:
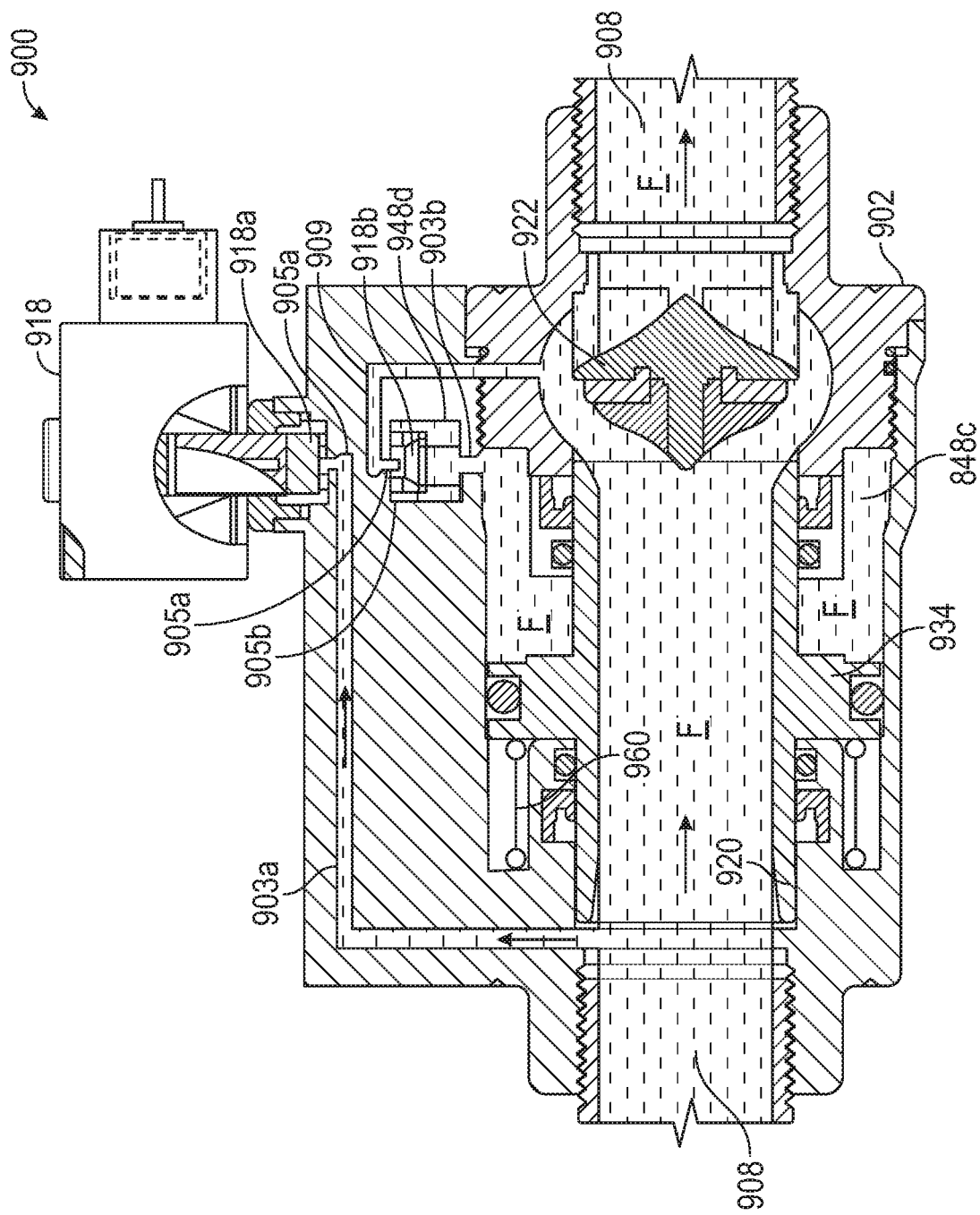
FIG. 20 is a side cross-sectional view of the valve of FIG. 18 in an open position.

FIG. 1 is a side cross-sectional view of one of many embodiments of a valve according to the disclosure in a closed position. FIG. 2 is a side cross-sectional view of the valve of FIG. 1 in a transitional position. FIG. 3 is a side cross-sectional view of the valve of FIG. 1 in an open position. FIG. 4 is a side cross-sectional view of another of many embodiments of a valve according to the disclosure in a closed position. FIG. 5 is a side cross-sectional view of the valve of FIG. 4 in a transitional position. FIG. 6 is a side cross-sectional view of the valve of FIG. 4 in an open position. FIG. 7 is a side cross-sectional view of yet another of many embodiments of a valve according to the disclosure in a closed position. FIG. 8 is a side cross-sectional view of still another of many embodiments of a valve according to the disclosure in a closed position. FIG. 9 is a side cross-sectional view of the valve of FIG. 8 in a transitional position. FIG. 10 is a side cross-sectional view of the valve of FIG. 8 in an open position. FIG. 11A is a detail view of one of many embodiments of a valve having a single valve member according to the disclosure. FIG. 11B is a detail view of one of many embodiments of a valve having a plurality of valve members according to the disclosure. FIG. 12 is a side cross-sectional view of one of many embodiments of a double coaxial valve according to the disclosure. FIG. 13 is a side cross-sectional view of another of many embodiments of a double coaxial valve according to the disclosure. FIG. 14 is a schematic view of yet another of many embodiments of a double coaxial valve according to the disclosure. FIG. 15 is a side cross-sectional view of one of many embodiments of an internally piloted coaxial valve according to the disclosure in a closed position. FIG. 16 is a side cross-sectional view of the valve of FIG. 15 in a transitional position. FIG. 17 is a side cross-sectional view of the valve of FIG. 15 in an open position. FIG. 18 is a side cross-sectional view of another of many embodiments of an internally piloted coaxial valve according to the disclosure in a closed position. FIG. 19 is a side cross-sectional view of the valve of FIG. 18 in a transitional position. FIG. 20 is a side cross-sectional view of the valve of FIG. 18 in an open position. FIGS. 1-20 will be described in conjunction with one another.

In at least one embodiment, a coaxial valve 100 according to the disclosure can include a valve body 102, such as a casing, encapsulation or housing, for enclosing, protecting or otherwise supporting one or more other valve components, and can include one or more inlets 104 for fluid flow into the valve and one or more outlets 106 for fluid flow out of the valve. Valve body 102 can be a single, unitary body or alternatively can include a plurality of valve body portions coupled together, and can be formed in any shape or manner according to a particular implementation of the disclosure. For example, as shown in the embodiment of FIGS. 1A-1C (collectively, "FIG. 1") for illustrative purposes, which embodiment is but one of many, body 102 can include a first body portion 102a and a second body portion 102b. Other variations are possible, and valve 100 can include any number of body portions according to a particular implementation, any of which can be coupled with one another in any applicable fashion. For example, valve 100 can, but need not, include one or more couplers 103 for coupling two or more valve components together, such as mating threads, other male couplers and/or female couplers, fasteners, receivers, adhesives or other coupling structure(s), separately or in combination.

Inlet 104 can include a plurality of inlet components or other inlet portions coupled together or otherwise disposed in fluid communication with one another and can include one or more inlet openings 104a for allowing fluid flow in one or more directions between the inside and outside of body 102. Opening 104a can be any shape(s) or dimension(s) according to an implementation of the disclosure. Inlet 104 can include an inlet conduit 104b for routing fluid or otherwise allowing fluid to move there through and one or more couplers 104c, which can be or include a separate coupler or an integral coupler portion, in whole or in part, for coupling with other structure 105 in a valve system, such as pipes, tubing, hoses, fluid sources, fluid receivers, fluid destinations or other conduits or components. As shown in FIGS. 1-3 for exemplary purposes, coupler 104c can be or include threads, but this need not be the case, and coupler 104c (if present) can be or include any type of fastener, fitting or other coupler now known or future developed, separately or in combination with one another. In at least one embodiment, coupler 104c can be or include a conduit end for joining with one or more other conduits, such as by brazing, welding, friction, adhesion, or in another manner. The foregoing description regarding opening 104a, conduit 104b and coupler 104c can apply similarly to one or more other inlets, outlets and other fluid ways of valve 100. For example, as shown in the exemplary embodiment of FIGS. 1-3, which is but one of many, outlet 106 can include one or more outlet openings 106a, outlet conduits 106b and/or outlet couplers 106c. Alternatively, one or more of these components can be absent, as appropriate in accordance with in implementation of the disclosure. In the relevant field, some may refer to a valve as a "valve fitting," for example, when structure(s) such as conduits 104a, 106a or couplers 104c, 106c are present. As used in the present disclosure, the term "valve" includes "valve fittings" when referring to the device as a whole (e.g., valve 100), unless otherwise indicated.

Valve 100 can include one or more flow passages 108, such as a valve flow passage, reservoir or other flow path, for routing or otherwise directing fluid through the valve from inlet 104 to outlet 106 (or vice versa). Flow passage 108 can include, or at least can be described to include for ease of illustration and explanation, two or more sub-flow passages (or component flow passages) that collectively make up the corresponding flow passage 108 through valve 100. For example, in at least one embodiment, flow passage 108 can include one or more first passages, such as an inlet or other flow passage, from inlet 104 to a location (which can be any location) along flow passage 108 and one or more second flow passages, such as an outlet or other flow passage, from such location along flow passage 108 to outlet 106. Valve 100 can include one or more other component flow passages as described in further detail elsewhere herein, separately or in combination with one another and/or any of first and second flow passages. Further, each component flow passage, such as first and second flow passages, can comprise a plurality of shorter passages or other paths (i.e., sub-sub-passages) between two or more locations or points along flow passage 108 or a portion thereof. Inlet 104, outlet 106 and flow passage 108 can, but need not, have a common axis, such as central longitudinal axis X, separately or in combination, in whole or in part.

Valve 100 can include one or more orifices 110, such as structure defining or otherwise including an opening, conduit or other passageway, for at least partially routing or otherwise affecting flow through the valve. Orifice 110 can be disposed at least partially within flow passage 108, such as fluidically between inlet 104 and outlet 106, and can house or otherwise cooperate with at least a portion of one or more sealing components of the valve (further described below). Orifice 110 can be configured for routing or otherwise allowing fluid to flow between inlet 104 and outlet 106 along flow passage 108, which can include by way of routing or allowing fluid to flow around or otherwise past one or more sealing components or other valve components disposed at least partially in flow passage 108. For example, in at least one embodiment, orifice 110 can have a larger flow area or volume than one or more other portions of flow passage 108, which can include having a flow area or volume sufficient to allow fluid to flow through orifice 110 around or past one or more components disposed at least partially within orifice 110, such as when valve 100 is in an open position. Orifice 110 can, but need not, include a plurality of openings or other flow paths for defining a portion of one or more flow passages of valve 100, such as, for example, an orifice flow passage 111 forming a part of flow passage 108. Orifice 110 can include one or more orifice inlets 110a for allowing fluid to enter the orifice and one or more orifice outlets 110b for allowing fluid to exit the orifice.

Valve 100 can include an actuator assembly 116 for controlling fluid flow through at least a portion of valve 100, separately or in cooperation with one or more other valve components. Actuator assembly 116 can be coupled to valve body 102, in whole or in part, such as to one or more of first and second body portions 102a, 102b, and can, but need not, include additional body structure, such as an actuator housing 117 for housing or otherwise supporting one or more actuation components. In at least one embodiment, actuator assembly 116 can include one or more valve members 120 and one or more actuators 118 for moving and/or retaining (or otherwise holding) valve member(s) 120 to, from or in one or more positions. Valve member 120 can have a first end 120a and a second end 120b and can have any number of positions relative to body 102 or another valve portion according to a particular implementation. For example, valve member 120 can have a fully closed position for maximizing resistance to flow through at least a portion of valve 100, which can include preventing flow there through. As another example, valve member 120 can have a fully open position for minimizing resistance to flow through at least a portion of valve 100, such as by minimizing flow resistance caused by valve member 120 or a portion thereof. Valve member 120 can have one or more partially open (or partially closed) positions between the fully open and fully closed positions for allowing fluid flow at one or more rates between a maximum and a minimum flow rate, which can be any flow rate(s) according to an embodiment or implementation at hand.

Actuator 118 can be or include structure for holding one or more valve members 120 in one or more positions and for moving such valve member(s) among positions, such as between two or more of the positions described above. For example, in the exemplary embodiment of FIGS. 1-3, actuator 118 can move valve member 120 between or among one or more closed (see, e.g., FIG. 1), transitional (see, e.g., FIG. 2) and open (see, e.g., FIG. 3) positions. In such an embodiment, which is but one of many, valve 100 can include one or more valve seats 122 or valve seat members for optionally coupling with one or more corresponding valve members 120 to limit or prevent fluid flow through valve 100. Valve seat 122 can be disposed at least partially within orifice 110 and, in at least one embodiment, can be coupled to orifice 110 and/or body 102 in a fixed or stationary position. Valve seat 122 can be unitary or can include two or more valve seats or valve seat portions. Valve member 120 and seat 122 can be configured to sealingly couple with one another for preventing or otherwise limiting fluid flow through one or more portions of flow passage 108, such as through orifice flow passage 111, in whole or in part. For instance, valve member 120 can have one or more ends (e.g., second end 120b) or other portions for sealingly engaging seat 122 or a portion thereof (e.g., an upstream or downstream side), which can include sealingly engaging one or more seals 124, such as a sealing disk or stopper, coupled to or otherwise associated with seat 122. In at least one embodiment, valve 100 can have a fully closed position wherein valve member 120 and seat 122 are sealingly engaged for preventing flow into and/or through orifice 110 and one or more open positions wherein valve member 120 and seat 122 are not sealingly engaged and, rather, are disposed relative to one another for allowing fluid flow. Valve member 120 or a portion thereof can be configured to seal with seat 122 in any sealing manner or configuration according to a particular application, which can include second end 120b being shaped or otherwise configured to mate with seat 122 and/or one or more seals 124 (if present) in fluid-tight engagement. For example, valve member 120 can, but need not, include one or more seals or other seal members coupled thereto for engaging seat 122 and/or one or more seals 124 (if present).

In at least one embodiment, valve member 120, which can be or include a sleeve, tube or piston sleeve, can be slideably coupled to body 102, such as to interior surface 126 and one or more supports 128, 130, for sliding into and out of sealing communication with orifice 110 during valve operations. For example, valve member 120 can include a tubular sleeve 132 for forming a portion of flow passage 108 and a piston 134, such as a disk or plate, for cooperating with sleeve 132 and one or more components of actuator assembly 116 or actuator 118, such as by transferring force(s) there between. Sleeve 132 and piston 134 can be sealingly coupled to body 102, such as to interior surface 126 and/or one or more supports 128, 130, which can include utilization of one or more seals 136. For example, as shown in FIGS. 1-3 for illustrative purposes, valve 100 can include one or more seals 136 coupled to piston 134 for sealingly engaging body 102 or surface 126, which can include being coupled to a radially exterior surface 138 of piston 134 or, as another example, to one or more grooves 139 in piston 134. Alternatively, or collectively, one or more seals 136 can be coupled to body 102 for sealing engagement with piston 134. Similarly, valve 100 can include one or more seals 140 for sealing engagement of sleeve 132, such as the exterior surface 142 of sleeve 132, and body 102, such as the interior surface 144 of one or more supports 128, 130. Seals 140 can be coupled to sleeve 132, supports 128, 130 (or another portion of body 102), or both, and can, but need not, be coupled to one or more grooves 146 in sleeve 132, supports 128, 130, or another portion of body 102. As shown in FIGS. 1-3 for illustrative purposes, one or more of seals 136, 140 can be or include an annular elastomeric seal, such as an O-ring, but this need not be the case and alternatively, or collectively, seals 136, 140 can be or include any type of seal having any cross-sectional shape according to a particular implementation of the disclosure, including elastomeric, non-elastomeric, dynamic and other seals. For example, in at least one embodiment, one or more of seals 136, 140 can be or include a diaphragm seal, such as a rolling diaphragm seal (see, e.g., FIG. 7).

Valve 100 can include one or more chambers 148, such as a cavity, compartment or space, for supporting movement of one of more valve components, such as valve member 120, and cooperation among one or more valve components such as valve member 120 and one or more components of actuator assembly 116 (further described below), during valve operations. For example, valve 100 can include chamber 148a, such as a bore or cylindrical opening, for receiving at least a portion of valve member 120 (e.g., at least a portion of sleeve 132), temporarily or otherwise. For instance, chamber 148a can receive and/or support at least a portion of first end 120a of valve member 120 when valve member 120 is in one or more positions, which can include any of one or more closed (see, e.g., FIG. 1), transitional (see, e.g., FIG. 2) and open (see, e.g., FIG. 3) positions, but need not include all positions. As an example, in at least one embodiment, first end 120a can travel into and out of chamber 148a during valve operations. Valve member 120 can, but need not, sealingly engage chamber 148a and can, but need not, include one or more seals (not shown) disposed at least partially between (e.g., in the radial direction about axis X) valve member 120 and chamber 148a. In at least one embodiment, valve 100 can include one or more chambers 148b, 148c for housing or otherwise supporting one or more components of actuator assembly 116 (further described below). For instance, chamber 148b can be disposed on one side of piston 134 and configured to house one or more components cooperating with that side of piston 134 or valve member 120 and chamber 148c can be disposed on another side of piston 134 and configured to house one or more components cooperating with such other side of piston 134 or valve member 120. One or more of chambers 148b, 148c can be fluidically separate from flow passage 108, in whole or in part (e.g., by way of one or more of the seals discussed above), and, in at least one embodiment, can be in fluid communication with at least a portion of actuator housing 117. The internal volumes of chambers 148b, 148c can change as piston 134 moves during valve operations.

As noted above, actuator assembly 116 can include one or more actuators 118 for moving valve member 120 between or among one or more positions and one or more housings 117 for housing or otherwise supporting at least a portion of an actuator 118. Housing 117 can include one or more chambers 119a, 119b. In at least one embodiment, such as the exemplary embodiment of FIGS. 1-3, actuator 118 can be or include an electrohydraulic actuator for moving valve member 120 in one or more directions via one or more fluids, such as hydraulic fluid or another actuation fluid. In such an embodiment, which is but one of many, valve 100 can include a hydraulic power unit 150 for applying fluid pressure on valve member 120 or a portion thereof (e.g., piston 134) to move valve member 120 in one or more directions, such as away from seat 122 and toward or to an open position, which can include a fully open position. Hydraulic power unit 150 can include a pump 152 in fluid communication with a working fluid 154, such as hydraulic fluid, in a fluid reservoir 156 and configured to pump fluid 154 into chamber 148c for exerting force on an area of valve member 120 to move valve member 120 (e.g., to the left as shown in FIGS. 1-3, or any other direction). Reservoir 156 and working fluid 154 can be fluidically separate from valve flow passage 108. In at least one embodiment, hydraulic power unit 150 can include one or more valves 158, such as a control valve, check valve or other valve, for controlling fluid flow into and/or out of reservoir 156 and/or chamber 148c. Reservoir 156 and one or more components of hydraulic power unit 150, such as pump 154 and valve 158, can, but need not, be at least partially disposed within housing 117 or a portion thereof, such as chamber 119b.

In at least one embodiment, actuator assembly 116 can include one or more biasing devices, such as one or more springs 160, for biasing valve member 120 or a portion thereof in one or more directions, which can include a direction opposite or otherwise opposed to forces exerted by hydraulic fluid 154. For example, spring 160 can bias valve member 120 toward seat 122 and toward or to a closed position, which can include a fully closed position, such as a position wherein sleeve 132 and seat 122 are sealingly coupled. In such an embodiment, which is but one of many, valve 100 can be referred to as a normally-closed valve wherein actuator 118 can overcome the closing force of spring 160 (which can be any force according to a particular implementation) to open valve 100 and spring 160 biases valve 100 toward a closed position absent such a force, such as during deactivation of actuator 118 or, for example, in the event of power loss to valve 100 or hydraulic power unit 150. However, this need not be the case and, in at least one embodiment, valve 100 (and other valve embodiments disclosed herein) can be or include a normally-open valve wherein actuator 118 can overcome the opening force of spring 160 (which can be any force according to a particular implementation) to close valve 100 and spring 160 biases valve 100 toward an open position absent such a force.

In at least one embodiment, valve 100 can include one or more switches 162 for controlling one or more aspects of valve operations. For example, switch 162 can be or include a mechanical, optical, magnetic or other limit switch for limiting a travel distance d of valve member 120, such as by stopping or limiting the application of hydraulic fluid 154 to piston 132. Switch 162 and/or other electrical components 164, such as terminals, controllers, other switches, indicators, lights or wiring (if present), can be wholly or partially housed within or supported by housing 117 or a portion thereof, such as chamber 117a. Chamber 117a can, but need not, be in fluid communication with one or more other chambers, such as chamber 148b of body 102, and can, but need not, be fluidically separated from one or more other chambers, such as chamber 117b or chamber 148c, separately or in combination, in whole or in part.

With continuing reference to the figures, and specific reference to FIGS. 4-6, another of many embodiments of a valve according to the disclosure will be described. Valve 200 functions in a similar manner to valve 100 described above and can include one or more of the same or similar components that may appear with like reference numerals and need not be described in detail again here. However, valve 200 can differ from valve 100 in that it can have a different actuator assembly 216, which can include an electromechanical actuator 218 and one or more other valve components for cooperating therewith that may be similar to those described above with regard to valve 100 but may nonetheless differ in one or more ways. FIGS. 4, 5 and 6 illustrate valve 200 in closed, transitional and open positions, respectively. Once again, while valve 200 is shown in a normally-closed configuration, a person of ordinary skill in the relevant art having the benefits of this disclosure will appreciate that valve 200 can also be a normally-open valve, such as, for example, by reversing the directions in which valve member 220 is biased by spring 160 and moved by actuator assembly 216, respectively.

In at least one embodiment, valve 200 can include an electromechanical actuator 218 and can have an actuator housing 217, valve member 220 and body 202 for cooperating with actuator 218 to open and close valve 200. Housing 217 can have a single internal space, but need not and, in at least one embodiment, can include two or more separate chambers such as chambers 119a, 119b described above with regard to valve 100.

Actuator assembly 216 can include an electromechanical actuator 218 for moving a lead screw 270 in one or more directions, such as clockwise and/or counterclockwise relative to body 202. In at least one embodiment, lead screw 270 can have internal threads 272 for threadably communicating with external threads 274 on body 202, which can, but need not, include a body portion 202b threadably or otherwise coupled to another body portion 202a, housing 217, or both. Lead screw 270 can have any type of teeth or threads according to an implementation of the disclosure and, in at least one embodiment, can be a high pitch lead screw. Actuator 218 can include a motor 276, such as an electric motor, stepper motor, or other motor, for driving one or more gears 278, such as a single gear or, in at least one embodiment, a plurality of gears (not shown), such as a plurality of gears making up a gear box or gear drive for reducing motor speed and multiplying torque applied to lead screw 270. As another example, actuator 218 can include one or more solenoids, separately or in combination with motor 276, for selectively engaging motor 276 and gear 278 in driving communication. Gear 278, such as a drive gear, can have teeth 280a for communicating with external teeth 280b on lead screw 270. Motor 276 can directly or indirectly drive gear 278, which can turn lead screw 270 about axis X and move lead screw 270 in one or more directions. For example, lead screw 270 can move to the left (in the exemplary configuration shown in FIGS. 4-6) and can contact valve member 220 or a portion thereof, such as piston 234, to overcome the closing force of spring 160 and force valve member 220 away from seat 122 to at least partially open valve 200 (see, e.g., FIGS. 5-6). As another example, lead screw 270 can move to the right (in the exemplary configuration shown in FIGS. 4-6) and can remain in contact with valve member 220 or a portion thereof, such as under the return force of spring 160, to succumb to the closing force of spring 160 and allow valve member 220 to move toward and/or sealingly engage seat 122 to at least partially close valve 200. In at least one embodiment, motor 276 and gear 278 can actively turn lead screw 270 during closing of valve 200. Alternatively, motor 276 and/or gear 278 can passively turn as lead screw 270 turns during closing of the valve, such as under the force of spring 160, which can include limiting or turning off power supplied to motor 276, such as via one or more electrical components 164 disposed within housing 217 or elsewhere and which control power supplied to motor 276 (and/or one or more solenoid-driven gear drives, if present) from a power source.

In at least one embodiment, valve 200 can include one or more auxiliary power sources, such as one or more capacitors 282, which can include one or more super capacitors, for providing power to valve 200 or actuator 218 under one or more conditions, such as in the event of a loss of primary power. For example, capacitor 282 can be in electrical communication with motor 276 (and/or one or more electrical components 164) and can provide current to motor 276 in the event of a primary power loss to cause actuator 218 to move valve member 220 to a default position, which can be or include a fully open position, a fully closed position, or any other position according to an implementation of the disclosure, such as a partially open/closed position. Spring 160 (if present) can be or include one or more of any type of spring or other biasing device according to an implementation of the disclosure, including, but not limited to, torsional springs, clock springs, tension springs, compression springs and coil springs, separately or in combination, in whole or in part. Further, while spring 160 is shown to be on a side of piston 234 opposite lead screw 270 in the exemplary embodiment of FIGS. 4-6, this need not be the case and alternatively, or collectively, spring 160 can be or include one or more springs coupled to lead screw 270 and adapted for turning or rotating lead screw 270 in one or more directions to open or close valve 200. As yet another example, in at least one embodiment of valve 200, motor 276 can be or include a linear stepper motor for driving valve member 220 in one or more directions, such as toward and/or away from seat 122. In such an embodiment, which is but one of many, lead screw 270 can, but need not, be absent.

With continuing reference to the figures, and specific reference to FIG. 7, another of many embodiments of a valve according to the disclosure will be described. Valve 300 functions in a manner similar to those of valves 100, 200 described above and can include one or more of the same or similar components that may appear with like reference numerals and need not be described in detail again here. However, valve 300 can differ from, for example, valve 200 in that actuator 218 and one or more other valve components, such as lead screw 270, can be disposed on or otherwise configured to cooperate with the opposite side of valve member 220 as compared to the embodiment of FIGS. 4-6. For example, lead screw 270 can be rotatably coupled to housing portion 202a and actuator assembly 216 can pull valve member 220 away from seat 122 against the force of spring 160 instead of pushing valve member 220 away from seat 122 as in the embodiment of valve 200 described above. As another example, one or more seals 140 can be or include a diaphragm seal, such as a rolling diaphragm seal.

Furthermore, in at least one embodiment, valve 300, can include a releasable coupler 302 for optionally coupling and uncoupling lead screw 270 and valve member 220 to one another during valve operations. For instance, coupler 302 can be or include a magnet 304, such as an electromagnet, for coupling lead screw 270 and valve member 220 together during powered valve operations to allow lead screw 270 to open valve 300 by moving valve member 220 in a direction away from seat 122 against the force of spring 160. In the event of a power loss or other situation calling for valve 300 to return to or otherwise take up a default position, magnet 304 can be turned off to uncouple lead screw 270 and valve member 220 and valve member 220 can move to a default position, such as under a return force of spring 160. Such a default position can be a closed position as illustrated in the normally-closed configuration of FIG. 7 for illustrative purposes, but this need not be the case and valve 300 can alternatively be configured as a normally-open valve. Magnet 304 can be controlled by electrical components 164, which can be at least partially housed in housing 217. In at least one embodiment, valve 300 can include one or more other types of couplers 302 for releasably holding lead screw 270 and valve member 220 together for failsafe operation, whether separately or in combination with magnet 304, such as fasteners, mechanically or electromechanically actuated couplers, manual releases and the like.

With continuing reference to the figures, and specific reference to FIGS. 8-10, another of many embodiments of a valve according to the disclosure will be described. Valve 400 can function in a similar manner to one or more of valves 100, 200, 300 described above and can include one or more of the same or similar components that may appear with like reference numerals and need not be described in detail again here. However, valve 400 can differ from the foregoing valves in that it can have features for redundant operation that can help ensure failsafe performance in the field. FIGS. 8, 9 and 10 illustrate valve 400 in closed, transitional and open positions, respectively. While valve 400 is shown in FIGS. 8-10 in a normally-closed configuration, a person of ordinary skill in the relevant art having the benefits of this disclosure will appreciate that valve 400 can also be a normally-open valve.

In at least one embodiment, valve 400 can include an actuator assembly 416 having one or more actuators 418 for moving a plurality of valve members 420*a*, 420*b* to open and close valve 400, such as by allowing and preventing fluid flow there through in cooperation with one or more valve seats 422. Valve member 420*a* can be similar to or the same as one or more of valve members 120, 220 described above and actuator 418 can move valve member 420*a* in and out of sealing communication with valve seat 422 (which can include one or more seals 124) during valve operations in the same or a similar manner to actuators 118, 218 described above with reference to FIGS. 1-7. In addition, valve 400, which can be referred to herein as a double coaxial valve) can include a second valve member 420*b* configured to control fluid flow through valve 400 in a manner redundant to the operation of valve member 420*a*, which can include independent or collective operation with valve member 420*a*. In at least one embodiment, valve body 402 can be arranged for holding a plurality of valve members and valve member 420*b* can be disposed at least partially within body 402 for communicating with seat 422 in a similar manner to valve member 420*a*, but from a different direction, such as a longitudinally opposite direction. In such an embodiment, which is but one of many, a valve seat 422 can have one or more sides and/or one or more additional seals 124 (if present) for sealably coupling with valve member 420*b*. As shown in the exemplary embodiment of FIGS. 8-10 for illustrative purposes, actuator 418 can be or include an electrohydraulic actuator similar to actuator 118 described above with reference to valve 100 and valve 400 can include one or more additional components, such as control valve 458, spring 460, switch 462 and electrical components 464 for cooperating with second valve member 420*b* (and/or valve member 420*a*) in the same or a similar manner as the corresponding valve components described above cooperate with valve member 120 or valve member 420*a*, but wherein the opening and closing directions of valve member 420*b* are different from, such as by being the opposite of, the opening and closing directions of valve members 120, 420*a*, respectively (see, e.g., arrows A and B in FIG. 9, illustrating opening directions for valve members 420*a* and 420*b*, respectively). In such an embodiment, valve 400 or actuator assembly 416 can include a single pump 152 and reservoir 156 and two valves 158, 458 can be controlled to respectively move valve members 420*a*, 420*b* into and out of sealing communication with seat 422, which can occur at the same rate, at different rates, simultaneously, selectively, independently or otherwise. Optionally, valve 400 can include one or more additional redundant components for operating valve member 420*b*, such as one or more additional pumps or reservoirs (not shown), which can, but need not, be at least partially disposed within housing 417. As another option, one or both of valve members 420*a*, 420*b* (or any other valve member disclosed herein) can utilize or include a releasable coupler 302 described above with reference to FIG. 7 (see, e.g., FIG. 12).

In these manners, valve 400 can have redundant valve members 420*a*, 420*b* for helping ensure failsafe operation, such as in the event of the failure of one valve member due to wear, malfunction or otherwise during valve operations. Moreover, valve 400 advantageously can provide redundancy with minimal or no further flow resistance or adverse effect on flow rate versus an embodiment having a single valve member, such as the embodiments of valves 100, 200, 300. More specifically, as will be appreciated by a person of ordinary skill in the art having the benefits of the present disclosure, the embodiment of valve 400 illustrated in FIGS. 8-10, which is but one of many, utilizes opposite sides of valve seat 422 for sealing engagement with valve member 420*a*, 420*b*, respectively, and valve seat 422 creates little or no greater restriction to flow through orifice 410 than does valve seat 122 through orifice 110 (see, e.g., FIG. 1). In other words, as perhaps best illustrated in FIGS. 11A and 11B, valve seat 422 can sealably couple with two different valve members while maintaining or effectively maintaining the flow characteristics of a similarly sized embodiment of, e.g., valve 100 having only a single valve member because valve seat 422 and/or orifice 410 need not present any greater surface area or other obstruction to fluid flow through valve 400 than would valve seat 122 and/or orifice 110 and the flow volume of flow passage 111 through orifice 110, 410 can be the same or effectively the same for valves of the same size (i.e., in terms of flow area or flow diameter, which can include, but is not limited to, sizes ranging from ¼ inch to 6 inches, for example).

With continuing reference to the figures, and specific reference to FIGS. 12-13, two others of many embodiments of a double coaxial valve according to the disclosure will be described. As shown in FIG. 12, in at least one embodiment, a double coaxial valve 500 according to the disclosure can generally function in the same or a similar manner as one or more of valves 100-400 described above, but instead of (or collectively with) the electrohydraulic actuator 418 of valve 400 can include an actuator assembly 516 housed at least partially within housing 517 and/or valve body 502 and including one or more electromechanical actuators 518 similar to those described above with reference to valve 200. For example, valve 500 can include a first actuator 518*a* and lead screw 570*a* for moving a first valve member 520*a* in at least one of an opening and closing direction relative to valve seat 522 (e.g., side 522*a*) and a second actuator 518*b* and lead screw 570*b* for moving a second valve member 520*b* in at least one of an opening and closing direction relative to valve seat 522 (e.g., side 522*b*). One or both of valve members 520*a*, 520*b* can, but need not, include one or more releasable couplers 302 and/or seals 140 (which can be rolling diaphragm seals or other types of seals) as described in more detail above with reference to FIG. 7.

Turning now to FIG. 13, in at least one embodiment, a double coaxial valve 600 according to the disclosure can generally function in the same or a similar manner as one or more of valves 100-500 described above, but instead of (or collectively with) one or more of the actuator assemblies of valves 100-500, can include a solenoid actuator assembly 616 housed at least partially within one or more housings 617a, 617b and/or valve body 602 and including one or more solenoid actuators 618a, 618b. For example, valve 600 can include a first actuator 618a having a first coil 619a for moving a first valve member 620a in at least one of an opening and closing direction relative to valve seat 622 (e.g., side 622a) and a second actuator 618b having a second coil 619b for moving a second valve member 620b in at least one of an opening and closing direction relative to valve seat 622 (e.g., side 622b). As shown in FIG. 13 for illustrative purposes, valve 600 can be or include a normally-closed embodiment and one or more springs 160 can bias valve members 620a, 620b toward a closed position, such as a fully closed position wherein at least one of valve members 620a, 620b can sealingly engage seat 622 to prevent fluid flow through valve 600. Upon activation, coils 619a, 619b can be energized and can create a magnetic field that interacts with respective valve members 620a, 620b or portions thereof (such as magnetic portions) to move valve members 620a, 620b out of sealing engagement with seat 622 against the force of springs 160. In the illustrative embodiment of FIG. 13, which is but one of many, valve members 620a, 620b can move in the left and right directions, respectively, away from seat 622 during opening and can move in the longitudinally opposite directions toward seat 622 during closing. Upon deactivation, coils 619a, 619b can be deenergized, whether completely, instantaneously, over time, in a controlled manner, or otherwise, the magnetic field that interacts with respective valve members 620a, 620b during opening can decrease in magnitude (optionally to zero), and one or more valve members 620a, 620b can move toward and/or into sealing engagement with seat 622 under the force of springs 160. Alternatively, or collectively, in at least one embodiment, valve 600 can be or include a normally-open valve and one or more springs 160 can bias valve members 620a, 620b toward an open position, such as a fully open position wherein valve members 620a, 620b are in a position(s) of maximum displacement from seat 622 to allow fluid flow through valve 600, which can be or include any amount of displacement or fluid flow according to an implementation of the disclosure. In such an embodiment, which is but one of many, coils 619a, 619b can be energized and can move valve members 620a, 620b into sealing engagement with seat 622 against the force of springs 160 in a similar, but opposite, arrangement of that discussed above for the exemplary normally-closed embodiment of FIG. 13.

With continuing reference to the figures, and specific reference to FIG. 14, another of many embodiments of a double coaxial valve according to the disclosure will be described. As shown in FIG. 14, in at least one embodiment, a double coaxial valve 700 according to the disclosure can generally function in the same or a similar manner as one or more of valves 100-600 described above, which can include having a pair of redundant valve members 720a, 720b that can be opened and closed relative to one or more valve seats 722 by one or more actuators 718a, 718b and/or biasing devices 760a, 760b, such as one or more springs or other devices for biasing one or more of valve members 720a, 720b in an open or closed direction (e.g., longitudinally along axis X of valve body 702). However, differently than the double coaxial valve embodiments described above, valve 700 can include valve members 720a, 720b that open and close in the same direction as one another, which can include being at least partially concentric. For example, valve member 720a can be disposed at least partially within valve member 720b and each can have a sealing end 721a, 721b for sealingly engaging valve seat 722 in a closed position, such as a fully closed position. Valve members 720a, 720b and/or sealing ends 721a, 721b can couple with valve seat 722 at the same time or at different times and can engage the same surface of seat 711 or different surfaces, which can include coupling with one or more seals 124 (if present). Actuators 718a, 718b can be or include any of the actuators disclosed herein (e.g., actuators 118-618) or another actuator, separately or in combination, in whole or in part. Further, while two actuators 718a, 718b are shown for illustrative purposes, this need not be the case and, in at least one embodiment, valve 700 can include a single actuator for actuating both valve members 720a, 720b. In these manners, valve 700 can have redundant valve members 720a, 720b for helping ensure failsafe operation with minimal or no added flow resistance for the same reasons described in more detail above with reference to valve 400.

With continuing reference to the figures, and specific reference to FIGS. 15-17, another of many embodiments of a valve according to the disclosure will be described. Valve 800 can function in a similar manner to one or more of the other valve embodiments of the present disclosure in that valve 800 can include one or more valve members 820 that can optionally couple in sealing engagement with one or more valve seats 822. One or more of the same or similar components described elsewhere herein may appear with like reference numerals and need not be described in detail again here. Valve 800 can differ from, for example, valves 100-600, in that it can have a different actuator assembly 816, which can include a solenoid pilot actuator 818 and one or more other valve components for cooperating therewith that may be similar to those described above with regard to other valve embodiments but may nonetheless differ in one or more ways. FIGS. 15, 16 and 17 illustrate valve 800 in closed, transitional and open positions, respectively. While valve 800 is shown in a normally-closed configuration having a single valve member 820 for illustrative purposes, this need not be the case. For example, in at least one embodiment, valve 800 can also be a normally-open valve; as other examples, valve 800, in one or more embodiments, can have a plurality of valve members 820 that can move in the same or different directions and/or a plurality of actuators 818.

In at least one embodiment, valve 800 can include pilot actuator 818 and can have an actuator housing 817, valve member 820 and body 802 for cooperating with actuator 818 to open and close valve 800, which can include moving valve member 820 in one or more directions by way of the pressure of fluid 801 within or flowing through flow passage 808 of valve 800. Valve member 820, which can be or include a sleeve, tube or piston sleeve, can be slideably coupled to body 802, such as to interior surface 826 and one or more supports 828, 830, for sliding into and out of sealing communication with orifice 810 and/or seat 822 during valve operations. Valve member 820 can include a tubular sleeve 832 for forming a portion of flow passage 808 and a piston 834, such as a disk or plate, for cooperating with sleeve 832 and one or more components of actuator assembly 816 or actuator 818, such as by transferring force(s) there between. Sleeve 832 and piston 834 can be sealingly coupled to body 802, such as to interior surface 826 and/or one or more supports 828, 830, which can include utilization of one or more seals 836. For example, as shown in FIGS. 15-17 for illustrative purposes, valve 800 can include one or more seals 836 coupled to piston 834 for sealingly engaging body 802 or surface 826. Similarly, valve 800 can include one or more seals 840 for sealing engagement of sleeve 832, such as the exterior surface 842 of sleeve 832, and body 802, such as the interior surface 844 of one or more supports 828, 830. As shown in FIGS. 15-17 for illustrative purposes, one or more of seals 836, 840 can be or include an annular elastomeric seal, such as an O-ring, but this need not be the case and alternatively, or collectively, seals 836, 840 can be or include any type of seal having any cross-sectional shape according to a particular implementation of the disclosure, including elastomeric, non-elastomeric, dynamic and other seals. For example, in at least one embodiment, one or more of seals 836, 840 can be or include a diaphragm seal, such as a rolling diaphragm seal (see, e.g., FIG. 7).

Valve 800 can include one or more chambers 848, such as a cavity, compartment or space, for supporting movement of one of more valve components, such as valve member 820, and cooperation among one or more valve components such as valve member 820 and one or more components of actuator assembly 816 (further described below) during valve operations. For example, valve 800 can include chamber 848a for receiving at least a portion of valve member 820 (e.g., at least a portion of sleeve 832), temporarily or otherwise, such as when valve member 820 is in one or more positions, which can include any of one or more closed (see, e.g., FIG. 15), transitional (see, e.g., FIG. 16) and open (see, e.g., FIG. 17) positions, but need not include all positions. Valve 800 can include one or more chambers 848b, 848c for housing or otherwise supporting one or more components of actuator assembly 816 (further described below). For instance, chamber 848b can be disposed on one side of piston 834 and configured to house one or more components cooperating with that side of piston 834 or valve member 820 and chamber 848c can be disposed on another side of piston 834 and configured to house one or more components cooperating with such other side of piston 834 or valve member 820. One or more of chambers 848b, 848c can be fluidically separate from flow passage 808, in whole or in part (e.g., by way of one or more of the seals discussed above) and, in at least one embodiment, can be in fluid communication with at least a portion of actuator housing 817. The internal volumes of chambers 848b, 848c can change as piston 834 moves during valve operations.

Actuator assembly 816 can include a pilot actuator 818, such as a two-way, three-way or other solenoid operated pilot valve, in fluid communication with at least a portion of flow passage 808 and chamber 848c of valve body 802. For example, body 802 can include one or more pilot flow passages 803 in fluid communication with actuator 818, such as pilot flow passage 803a between actuator 818 and flow passage 808, which can include being in fluid communication with a portion 808a of flow passage 808 fluidically upstream of valve member 820 or piston 834, and flow passage 803b between actuator 818 and chamber 848c, which can be or include a piston bore or piston bore volume. Actuator 818 can include one or more valve members 818a, such as a pilot valve member, for optional sealing engagement with one or more pilot orifices 805 (which can include one or more seats 807) to control fluid flow along flow passage 803. Upon actuation, actuator 818 can uncouple valve member 818a from pilot orifice 805 and fluid F can flow from flow passage 808 through flow passage 803 to chamber 848c and into contact with valve member 820 or a portion thereof, such as piston 834 (see FIG. 16). Fluid pressure from fluid F can move valve member 820 out of sealing engagement with seat 822 (e.g., to the left as shown in exemplary FIG. 16) against the force of one or more biasing devices, such as return spring 860. Fluid F from chamber 848c can flow out of chamber 848c and return to flow passage 808 via one or more bleed passages 809, which can be or include one or more flow paths in fluid communication with chamber 848c and orifice 810 or another portion of valve flow path 808 fluidically downstream of piston 834. As shown in the exemplary embodiment of FIGS. 15-17 for illustrative purposes, bleed passage 809 can be or include one or more bleed clearances between valve member 820 and body 802 or portions thereof. However, this need not be the case and alternatively, or collectively, bleed passage 809 can be or include one or more flow paths formed in a portion of body 802 or otherwise routed between chamber 848c and flow passage 808 (e.g., similarly to the exemplary form of pilot flow passage 803a illustrated in FIGS. 15-17). Fluid F can flow into chamber 848c faster or at a greater flow rate than fluid F can exit flow chamber 848c for holding valve member 820 in one or more open positions. For example, pilot flow passage 803 can have a greater flow area or flow volume than bleed passage 809. To close valve 800, actuator 818 can sealingly engage seat 807 to at least partially prevent fluid flow through pilot orifice 805, force exerted on piston 834 by fluid F in chamber 848c can decrease, and a return force or other force from spring 860 can move valve member 820 toward or to one or more closed positions, which can include a fully closed position wherein valve member 820 is sealingly coupled in fluid tight engagement with seat 822.

With continuing reference to the figures, and specific reference to FIGS. 18-20, another of many embodiments of a valve according to the disclosure will be described. Valve 900 can function in a similar manner to one or more of the other valve embodiments of the present disclosure, including, but not limited, to valve 800, and one or more of the same or similar components described elsewhere herein may appear with like reference numerals and need not be described in detail again here. Valve 900 can differ from, for example, valve 800, in that it can have a different actuator assembly 916, which can include a different solenoid pilot actuator 918 and one or more other valve components for cooperating therewith that may be similar to those described above with regard to other valve embodiments but may nonetheless differ in one or more ways. FIGS. 18, 19 and 20 illustrate valve 900 in closed, transitional and open positions, respectively. While valve 900 is shown in a normally-closed configuration having a single valve member 920 for illustrative purposes, this need not be the case. For example, in at least one embodiment, valve 900 can also be a normally-open valve; as other examples, valve 900, in one or more embodiments, can have a plurality of valve members 920 that can move in the same or different directions and/or a plurality of actuators 918.

In at least one embodiment, valve 900 can include pilot actuator 918 and can have an actuator housing 917, valve member 920 and body 902 for cooperating with actuator 918 to open and close valve 900, which can include moving valve member 920 in one or more directions by way of the pressure of fluid 901 within or flowing through at least a portion of flow passage 908 of valve 900. As such, valve 900 can be similar to valve 800 described above in a number of ways, but can differ, for example, in that actuator 918 can be or include a three-way solenoid pilot (also known as a 3/2 pilot) versus the exemplary two-way pilot (or 2/2 pilot) of valve 800 and one or more other valve components, such as body 902, can be configured for cooperating with actuator 918 accordingly. For example, body 902 can include one or more pilot flow passages 903 in fluid communication with actuator 918, such as pilot flow passage 903a between actuator 918 and flow passage 908, which can include being in fluid communication with a portion 908a of flow passage 908 fluidically upstream of valve member 920 or piston 934, and flow passage 903b between actuator 918 and chamber 948c, which can be or include a piston bore or piston bore volume. In at least one embodiment, body 902 can also include one or more bleed passages 909, which can be or include one or more flow paths in fluid communication with chamber 948c and orifice 910 or another portion of valve flow path 908 fluidically downstream of piston 934. Bleed passage(s) 909 can be in direct fluid communication with chamber 948c or, as shown in the exemplary embodiment of FIGS. 18-20, which is but one of many, can be in fluid communication with one or more bleed chambers 948d in fluid communication with chamber 948c, or both.

Actuator 918 can include one or more actuator valve members 918a, 918b for optional sealing engagement with one or more pilot orifices 905a, 905b (which can include one or more seats 907a, 907b) to control fluid flow along flow passage 903 and bleed passage 909. Actuator 918 can move actuator valve members 918a, 918b independently or collectively per the configuration or application of a particular implementation of the disclosure. Upon actuation, actuator 918 can uncouple valve member 918a from pilot orifice 905a and fluid F can flow from flow passage 908 through flow passages 903a, 903b to chamber 948c and into contact with valve member 920 or a portion thereof, such as piston 934 (see FIG. 18). Simultaneously, or at another time, actuator 918 can couple valve member 918b with pilot orifice 905b or seat 907b and fluid F can be wholly or partially prevented from flowing through orifice 905b to bleed passage 909 from chambers 948c, 948d and returning to flow passage 908. Fluid pressure from fluid F can move valve member 920 out of sealing engagement with seat 922 (e.g., to the left as shown in exemplary FIG. 18) against the force of one or more biasing devices, such as return spring 960 (see FIG. 19). Upon closing of valve 900, actuator 918 can couple valve member 918a with pilot orifice 905a via seat 907a and can uncouple valve member 918b from pilot orifice 905b and fluid F can be at least partially prevented from flowing into chamber 948c and allowed to flow through bleed passage 909 from chambers 948c, 948d and return to flow passage 908. Accordingly, force exerted on piston 934 by fluid F in chamber 948c can decrease, and a return force or other force from spring 960 can move valve member 920 toward or to one or more closed positions, which can include a fully closed position wherein valve member 920 is sealingly coupled in fluid tight engagement with seat 922.

In at least one embodiment, a valve can include a valve body having a valve flow passage there through, a fluid inlet and a fluid outlet fluidically downstream from the fluid inlet, which can include an inlet and an outlet coaxial about a central longitudinal axis and/or other locations along a valve flow path coaxial about an axis, a valve seat disposed in the valve flow passage fluidically between the inlet and the outlet, a valve member slideably and sealingly coupled to the valve body and configured to optionally couple with the valve seat, such as to restrict or prevent fluid flow through the valve, a biasing device configured to bias the valve member in one or more longitudinal or other directions, which can include into or out of, or toward or away from, sealing engagement with the valve seat, and an actuator assembly configured to optionally move the valve member in one or more longitudinal directions, which can include a direction opposite or otherwise different from a first or other longitudinal direction and into or out of, or toward or away from, sealing engagement with the valve seat. An actuator assembly can include at least one of an electrohydraulic actuator, an electromechanical actuator, a pump, an electric motor, a stepper motor, a gear box, an electromagnet, a solenoid, a pilot valve and a combination thereof.

In at least one embodiment, a valve can include one or more additional valve members, such as a second valve member, slideably and sealingly coupled to the valve body, and a second biasing device configured to bias the second valve member into or out of sealing engagement with the valve seat. An actuator assembly can be configured to optionally move a second valve member into or out of sealing engagement with a valve seat, which can include the same or a different valve seat. In at least one embodiment, a first valve member can be configured to couple with an upstream side of a valve seat and a second valve member can be configured to couple with a downstream side of a valve seat. An actuator assembly can be configured to optionally move the second valve member in one or more directions.

In at least one embodiment, first and second valve members can be configured to couple with the same side of a valve seat and an actuator assembly can be configured to optionally move the valve members in one or more directions. In at least one embodiment, a second valve member can be at least partially tubular and at least a portion of a first valve member can be disposed within the second valve member. A second valve member can be at least partially tubular and at least a portion of a first valve member and at least a portion of the second valve member can be concentric. In at least one embodiment, upstream and downstream sides of a valve seat can be disposed within one or more orifices, which can include a single orifice. In at least one embodiment, upstream and downstream sides of a valve seat can be opposite sides of a unitary valve seat member or a plurality of valve seat members.

A valve member can include a piston coupled to a tubular sleeve and slideably disposed within a chamber of the valve body, and an actuator assembly can be configured to move the valve member in one or more directions, such as a longitudinal direction, via or by way of pressurized fluid. In at least one embodiment, an actuator assembly can include one or more pumps configured to pump one or more working fluids into one or more chambers. In at least one embodiment, a valve can include one or more pilot flow passages in fluid communication with a valve flow passage and one or more chambers and an actuator assembly can include a pilot valve member configured to couple with a valve seat disposed in a pilot flow passage. A valve member can include a piston coupled to a tubular sleeve and slideably disposed within a chamber of the valve body. In at least one embodiment, a valve can include one or more bleed orifices in fluid communication with one or more chambers and a valve flow passage.

In at least one embodiment, a valve can include a valve body having a valve flow passage there through, a fluid inlet and a fluid outlet fluidically downstream from the fluid inlet, wherein the inlet and the outlet can be coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a first biasing device configured to bias the first valve member into sealing engagement with the valve seat, a second valve member slideably and sealingly coupled to the valve body and configured to optionally couple with the valve seat to prevent fluid flow through the valve, a second biasing device configured to bias the second valve member into sealing engagement with the valve seat, and an actuator assembly coupled to the valve body and configured to optionally move the first and second valve members out of sealing engagement with the valve seat.

In at least one embodiment, a valve can include a first actuator configured to move the first valve member out of sealing engagement with the valve seat and a second actuator configured to move the second valve member out of sealing engagement with the valve seat. A first valve member can be configured to couple with the upstream side of the valve seat and a second valve member can be configured to couple with the downstream side of the valve seat. In at least one embodiment, first and second valve members can be configured to couple with the same or different sides of one or more valve seats.

One or more valve members can include an at least partially tubular sleeve, which can make up at least a portion of one or more valve flow passages. A biasing device can be configured to bias a valve member in a first longitudinal direction, and another biasing device can be configured to bias another valve member in one or more directions, which can be the same as or different from the first longitudinal direction. In at least one embodiment, a first biasing device can be configured to bias a first valve member in a first longitudinal direction, and a second biasing device can be configured to bias a second valve member in a second longitudinal direction that can be opposite the first longitudinal direction.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a spring configured to bias the first valve member in a first longitudinal direction, and an actuator assembly coupled to the valve body and configured to optionally move the first valve member in a second longitudinal direction opposite the first longitudinal direction, wherein the actuator assembly comprises a pump in fluid communication with a reservoir of working fluid, and a control valve fluidically between the reservoir and a chamber of the valve body, and wherein the actuator assembly is configured to move the valve member in the second longitudinal direction by pumping working fluid into the chamber. The first valve member can be biased toward the valve seat, away from the valve seat, or both.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a spring configured to bias the first valve member in a first longitudinal direction, and an actuator assembly coupled to the valve body and configured to optionally move the first valve member in a second longitudinal direction opposite the first longitudinal direction, wherein the actuator assembly comprises a motor, a gear, and a lead screw, and wherein the actuator assembly is configured to move the valve member in the second longitudinal direction by turning the lead screw. The first valve member can be biased toward the valve seat, away from the valve seat, or both.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a spring configured to bias the first valve member in a first longitudinal direction, and an actuator assembly coupled to the valve body and configured to optionally move the first valve member in a second longitudinal direction opposite the first longitudinal direction, wherein the actuator assembly comprises an actuator configured to move the valve member, and a coupler that releasably couples the valve member to at least a portion of the actuator, and wherein the coupler is configured to uncouple the valve member from the actuator upon the occurrence of an event. In at least one embodiment, the event can be a loss of power or a reduction in power. In at least one embodiment, the coupler can be or include one or more electromagnets. The first valve member can be biased toward the valve seat, away from the valve seat, or both.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a first biasing device configured to bias the first valve member in a first longitudinal direction, a second valve member slideably and sealingly coupled to the valve body and configured to optionally couple with the valve seat to prevent fluid flow through the valve, a second biasing device configured to bias the second valve member in a second longitudinal direction, and an actuator assembly coupled to the valve body and configured to optionally move the first valve member in the second longitudinal direction and the second valve member in the first longitudinal direction, wherein the actuator assembly comprises one or more pumps in fluid communication with one or more reservoirs of working fluid, and one or more control valves fluidically between the one or more reservoirs and one or more chambers of the valve body. The first and second valve members can be biased toward the valve seat, away from the valve seat, or both.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a first biasing device configured to bias the first valve member in a first longitudinal direction, a second valve member slideably and sealingly coupled to the valve body and configured to optionally couple with the valve seat to prevent fluid flow through the valve, a second biasing device configured to bias the second valve member in a second longitudinal direction, and an actuator assembly coupled to the valve body and configured to optionally move the first valve member in the second longitudinal direction and the second valve member in the first longitudinal direction, wherein the actuator assembly comprises one or more motors, one or more gears, and one or more lead screws, and wherein the actuator assembly is configured to move the valve members by turning the one or more lead screws. The first and second valve members can be biased toward the valve seat, away from the valve seat, or both.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a first biasing device configured to bias the first valve member in a first longitudinal direction, a second valve member slideably and sealingly coupled to the valve body and configured to optionally couple with the valve seat to prevent fluid flow through the valve, a second biasing device configured to bias the second valve member in a second longitudinal direction, and an actuator assembly coupled to the valve body and configured to optionally move the first valve member in the second longitudinal direction and the second valve member in the first longitudinal direction, wherein the actuator assembly comprises one or more solenoid actuators, and one or more coils, and wherein the actuator assembly is configured to move the valve members by energizing and/or deenergizing the one or more coils. The first and second valve members can be biased toward the valve seat, away from the valve seat, or both.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a first biasing device configured to bias the first valve member in a first longitudinal direction, a second valve member slideably and sealingly coupled to the valve body and configured to optionally couple with the valve seat to prevent fluid flow through the valve, a second biasing device configured to bias the second valve member in the first longitudinal direction, and an actuator assembly coupled to the valve body and configured to optionally move the first and second valve members in a second longitudinal direction, wherein each of the first and second valve members is configured to couple to the same side of the valve seat, wherein the actuator assembly comprises any of the actuator assemblies or actuator assembly components disclosed herein, separately or in combination, in whole or in part. The first and second valve members can be biased toward the valve seat, away from the valve seat, or both. The first and second valve members can be configured to couple with the upstream side of the valve seat, the downstream side of the valve seat, or both, or a combination thereof.

In at least one embodiment, a valve can include a valve body having a valve flow passage there through, a fluid inlet and a fluid outlet fluidically downstream from the fluid inlet, wherein the inlet and the outlet are coaxial about a central longitudinal axis, a stationary valve seat disposed in the valve flow passage fluidically between the inlet and the outlet, the valve seat having an upstream side and a downstream side, a first valve member slideably and sealingly coupled to the valve body and configured to optionally couple with the valve seat to prevent fluid flow through the valve, a spring configured to bias the first valve member in a first longitudinal direction, and an actuator assembly coupled to the valve body and configured to optionally move the first valve member in a second longitudinal direction opposite the first longitudinal direction, wherein the actuator assembly comprises a solenoid pilot actuator, one or more pilot flow passages, one or more pilot valve members, one or more pilot orifices, and one or more bleed passages, and wherein the actuator assembly is configured to move the valve member in the second longitudinal direction by optionally routing fluid from the valve flow passage into and out of a chamber in fluid communication with at least a portion of the valve member. The first valve member can be biased toward the valve seat, away from the valve seat, or both. The actuator assembly can include a plurality of pilot valve members and pilot orifices. The valve can include one or more bleed passages in fluid communication with a valve orifice. The actuator assembly can include one or more 2/2 pilots. The actuator assembly can include one or more 3/2 pilots or other pilots. The actuator assembly can include a second valve member slideably and sealingly coupled to the valve body, configured to optionally couple with the valve seat to prevent fluid flow through the valve, and configured to move in one or more directions that can be the same as or different from the first valve member.

In at least one embodiment, a valve can include a valve body, a fluid inlet and a fluid outlet fluidically downstream of the fluid inlet, wherein the inlet and the outlet can be coaxial about a central longitudinal axis, a stationary valve seat disposed fluidically between the inlet and the outlet, a first piston sleeve slideably and sealingly coupled to the valve body, a biasing device configured to bias the first piston sleeve in a first longitudinal direction, a first sealing member coupled to the first piston sleeve and configured to optionally couple with the valve seat to prevent fluid flow through the valve, and an actuator coupled to the valve body and configured to optionally move the first piston sleeve in a second longitudinal direction opposite the first longitudinal direction to uncouple the first sealing member from the valve seat and allow fluid flow through the valve. In at least one embodiment, an actuator can include at least one of an electrohydraulic actuator, a pump, an electric motor, a stepper motor, a gear box, an electro-magnet, a solenoid, a pilot valve and a combination thereof.

In at least one embodiment, a valve can include a second stationary valve seat disposed fluidically between the inlet and the outlet, a second piston sleeve slideably and sealingly coupled to the valve body, a second biasing device configured to bias the second piston sleeve in the second longitudinal direction, and a second sealing member coupled to the second piston sleeve and configured to optionally couple with the second valve seat to prevent fluid flow through the valve, wherein the actuator can be configured to optionally move the second piston sleeve in the first longitudinal direction to uncouple the second sealing member from the second valve seat.

In at least one embodiment, the second valve seat can be fluidically downstream from the first valve seat. In at least one embodiment, the first and second valve seats can be disposed within a single orifice. In at least one embodiment, the first and second valve seats can be disposed on opposite sides of a single valve seat member or can be or include separate valve seats or valve seat members. In at least one embodiment, an actuator can include a pump fluidically coupled to a first control valve in fluid communication with the first piston sleeve and a second control valve in fluid communication with the second piston sleeve. In at least one embodiment, the first piston sleeve can be coupled to the valve body with one or more rolling diaphragm seals.

In at least one embodiment, a valve can include a second piston sleeve slideably and sealingly coupled to the valve body, and a second sealing member coupled to the second piston sleeve and configured to optionally couple with the first valve seat to prevent fluid flow through the valve, wherein the actuator can be configured to optionally move the second piston sleeve in the second longitudinal direction to uncouple the second sealing member from the first valve seat. In at least one embodiment, a valve can include a second biasing device configured to bias the piston sleeve in the first longitudinal direction. In at least one embodiment, the second piston sleeve can be at least partially tubular and at least a portion of the first piston sleeve can be disposed within the second piston sleeve. In at least one embodiment, the second piston sleeve can be at least partially tubular and at least a portion of the first piston sleeve and at least a portion of the second piston sleeve can be concentric.

Other and further embodiments utilizing one or more aspects of the systems and methods disclosed herein can be devised without departing from the spirit of Applicants' disclosure. For example, the systems and methods disclosed herein can be used alone or to form one or more parts of other valves, valve components and/or fluid control systems. Further, the various methods and embodiments of the valves can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions. The term "fluid(s)" as used herein includes any substance or material capable of flowing, such as, for example, liquid(s), gas(es) and combinations thereof (regardless of whether one or more solids or other non-fluids may be present therein).

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:
1. A valve, comprising:
   a valve body having a valve flow passage there through;
   a fluid inlet and a fluid outlet fluidically downstream from the fluid inlet, wherein the inlet and the outlet are coaxial about a central longitudinal axis;
   a stationary valve seat disposed in the valve flow passage fluidically between the inlet and the outlet, the valve seat having an upstream side and a downstream side;
   a first valve member slideably and sealingly coupled to the valve body and configured to optionally couple with the valve seat to prevent fluid flow through the valve;
   a biasing device configured to bias the first valve member in a first longitudinal direction and into sealing engagement with the valve seat;
   an actuator assembly coupled to the valve body and configured to optionally move the first valve member in a second longitudinal direction opposite the first longitudinal direction and out of sealing engagement with the valve seat;
   a second valve member slideably and sealingly coupled to the valve body; and
   a second biasing device configured to bias the second valve member into sealing engagement with the valve seat;
   wherein the actuator assembly is configured to optionally move the second valve member out of sealing engagement with the valve seat;
   wherein the first and second valve members are configured to couple with the upstream side of the valve seat;
   wherein the actuator assembly is configured to optionally move the second valve member in the second longitudinal direction;
   wherein the second valve member is at least partially tubular; and
   wherein at least a portion of the first valve member is disposed within the second valve member.

2. The valve of claim 1, wherein the actuator assembly comprises at least one of an electrohydraulic actuator, an electromechanical actuator, a pump, an electric motor, a stepper motor, a gear box, an electromagnet, a solenoid, a pilot valve and a combination thereof.

3. The valve of claim 1, wherein at least a portion of the first valve member and at least a portion of the second valve member are concentric.

4. The valve of claim 1, wherein the upstream and downstream sides of the valve seat are disposed within a single orifice.

5. The valve of claim 1, wherein the upstream and downstream sides of the valve seat are opposite sides of a unitary valve seat member.

6. The valve of claim 1, wherein the first valve member comprises a piston coupled to a tubular sleeve and slideably disposed within a chamber of the valve body, and wherein the actuator assembly is configured to move the first valve member in the second longitudinal direction via pressurized fluid.

7. The valve of claim 6, wherein the actuator assembly comprises a pump configured to pump a working fluid into the chamber.

8. The valve of claim 6, further comprising a pilot flow passage in fluid communication with the valve flow passage and the chamber, and wherein the actuator assembly comprises a pilot valve member configured to couple with a valve seat disposed in the pilot flow passage.

9. The valve of claim 1, wherein the first valve member comprises a piston coupled to a tubular sleeve and slideably disposed within a chamber of the valve body, and further comprising a bleed orifice in fluid communication with the chamber and the valve flow passage.

10. A valve, comprising:
a valve body having a valve flow passage there through;
a fluid inlet and a fluid outlet fluidically downstream from the fluid inlet, wherein the inlet and the outlet are coaxial about a central longitudinal axis;
a stationary valve seat disposed in the valve flow passage fluidically between the inlet and the outlet, the valve seat having an upstream side and a downstream side;
a first valve member slideably and sealingly coupled to the valve body and configured to optionally couple with the valve seat to prevent fluid flow through the valve;
a first biasing device configured to bias the first valve member into sealing engagement with the valve seat;
a second valve member slideably and sealingly coupled to the valve body and configured to optionally couple with the valve seat to prevent fluid flow through the valve;
a second biasing device configured to bias the second valve member into sealing engagement with the valve seat; and
an actuator assembly coupled to the valve body and configured to optionally move the first and second valve members out of sealing engagement with the valve seat;
wherein the first valve member comprises a tubular sleeve that makes up at least a portion of the valve flow passage;
wherein the first valve member comprises a first end and a second end fluidically downstream from the first end; and
wherein the second end of the first valve member is configured to sealingly engage the upstream side of the valve seat when the first valve member is in a closed position.

11. The valve of claim 10, further comprising a first actuator configured to move the first valve member out of sealing engagement with the valve seat and a second actuator configured to move the second valve member out of sealing engagement with the valve seat.

12. The valve of claim 10, wherein the second valve member is configured to couple with the downstream side of the valve seat.

13. The valve of claim 10, wherein the second valve member is configured to couple with the upstream side of the valve seat.

14. The valve of claim 10, wherein the second valve member comprises a tubular sleeve that makes up at least a portion of the valve flow passage.

15. The valve of claim 10, wherein the first biasing device is configured to bias the first valve member in a first longitudinal direction, and wherein the second biasing device is configured to bias the second valve member in the first longitudinal direction.

16. The valve of claim 10, wherein the first biasing device is configured to bias the first valve member in a first longitudinal direction, and wherein the second biasing device is configured to bias the second valve member in a second longitudinal direction that is opposite the first longitudinal direction.

17. A valve, comprising:
a valve body having a valve flow passage there through;
a fluid inlet and a fluid outlet fluidically downstream from the fluid inlet, wherein the inlet and the outlet are coaxial about a central longitudinal axis;
a stationary valve seat disposed in the valve flow passage fluidically between the inlet and the outlet, the valve seat having an upstream side and a downstream side;
a first valve member slideably and sealingly coupled to the valve body and configured to optionally couple with the valve seat to prevent fluid flow through the valve, wherein the first valve member comprises a piston coupled to a tubular sleeve and slideably disposed within a chamber of the valve body;
a pilot flow passage in fluid communication with the valve flow passage and the chamber;
a biasing device configured to bias the first valve member in a first longitudinal direction and into sealing engagement with the valve seat; and
an actuator assembly coupled to the valve body and configured to optionally move the first valve member in a second longitudinal direction opposite the first longitudinal direction and out of sealing engagement with the valve seat, wherein the actuator assembly is configured to move the first valve member in the second longitudinal direction via pressurized fluid, and wherein the actuator assembly comprises a pilot valve member configured to couple with a valve seat disposed in the pilot flow passage.

18. A valve, comprising:
a valve body having a valve flow passage there through;
a fluid inlet and a fluid outlet fluidically downstream from the fluid inlet, wherein the inlet and the outlet are coaxial about a central longitudinal axis;
a stationary valve seat disposed in the valve flow passage fluidically between the inlet and the outlet, the valve seat having an upstream side and a downstream side;
a first valve member slideably and sealingly coupled to the valve body and configured to optionally couple with the valve seat to prevent fluid flow through the valve, wherein the first valve member comprises a piston coupled to a tubular sleeve and slideably disposed within a chamber of the valve body;
a bleed orifice in fluid communication with the chamber and the valve flow passage;
a biasing device configured to bias the first valve member in a first longitudinal direction and into sealing engagement with the valve seat; and
an actuator assembly coupled to the valve body and configured to optionally move the first valve member in a second longitudinal direction opposite the first longitudinal direction and out of sealing engagement with the valve seat.

* * * * *